(12) United States Patent
Kang

(10) Patent No.: US 10,649,475 B2
(45) Date of Patent: May 12, 2020

(54) VAPOR SPLITTER AND METHOD FOR ADJUSTING VAPOR SPLIT RATIO

(71) Applicant: BENIT M CO., LTD., Ulsan (KR)

(72) Inventor: Ki-Joon Kang, Gyeonggi-do (KR)

(73) Assignee: BENIT M CO., LTD., Ulsan (KR)

(*) Notice: Subject to any disclaimer, the term of this patent is extended or adjusted under 35 U.S.C. 154(b) by 0 days.

(21) Appl. No.: 15/540,021

(22) PCT Filed: Jan. 17, 2017

(86) PCT No.: PCT/KR2017/000554
§ 371 (c)(1),
(2) Date: Jun. 26, 2017

(87) PCT Pub. No.: WO2017/200179
PCT Pub. Date: Nov. 23, 2017

(65) Prior Publication Data
US 2018/0217618 A1     Aug. 2, 2018

(30) Foreign Application Priority Data

May 16, 2016  (KR) .................. 10-2016-0059661
Oct. 14, 2016  (KR) .................. 10-2016-0133521

(51) Int. Cl.
*G05D 11/00*   (2006.01)
*B01D 3/32*    (2006.01)
(Continued)

(52) U.S. Cl.
CPC .......... *G05D 11/006* (2013.01); *B01D 3/141* (2013.01); *B01D 3/205* (2013.01); *B01D 3/32* (2013.01);
(Continued)

(58) Field of Classification Search
CPC ........ B01D 3/205; B01D 3/42; B01D 47/021; B01D 53/185; B01D 3/4211; B01D 3/141;
(Continued)

(56) References Cited

U.S. PATENT DOCUMENTS 1,776,032 A     9/1930  Kobernik
2,428,889 A  * 10/1947  Nutter .................... B01D 3/205
                                                        261/114.2
(Continued)

FOREIGN PATENT DOCUMENTS

DE            699768  * 11/1940
EP          17799537     1/2020
(Continued)

OTHER PUBLICATIONS

EPO translation of Mccolloch DE 699768 published Nov. 7, 1940 (Year: 1940).*
(Continued)

*Primary Examiner* — Stephen Hobson
(74) *Attorney, Agent, or Firm* — Wells St. John P.S.

(57) ABSTRACT

Disclosed is a vapor splitter including: a chimney tray dividing an internal space of a housing into an upper space and a lower space; a chimney provided on the chimney tray to enable the upper space and the lower space to communicate with each other; a cap covering the chimney with a gap therebetween such that a gas discharge hole is formed so that gas, coming out through the chimney, can be transferred to the upper space through the gas discharge hole; a liquid feeding unit for feeding liquid to the upper space; and a liquid discharging unit for discharging the liquid out of the upper space. The size of the gas discharge hole is adjusted by controlling the height of the liquid collected on the
(Continued)

chimney. Further disclosed is a method of adjusting a vapor split ratio using the vapor splitter.

11 Claims, 23 Drawing Sheets

(51) Int. Cl.
  *B01D 47/02* (2006.01)
  *B01D 3/42* (2006.01)
  *B01D 3/20* (2006.01)
  *B01D 3/14* (2006.01)
  *B01D 53/18* (2006.01)
(52) U.S. Cl.
  CPC .............. *B01D 3/42* (2013.01); *B01D 3/4211* (2013.01); *B01D 47/021* (2013.01); *B01D 53/185* (2013.01)
(58) Field of Classification Search
  CPC .......... B01D 3/32; B01D 53/78; B01D 47/00; G05D 11/006
  See application file for complete search history.

(56) References Cited

U.S. PATENT DOCUMENTS

| | | | | |
|---|---|---|---|---|
| 3,025,041 | A * | 3/1962 | Sandler | B01D 3/163 261/114.4 |
| 4,305,895 | A * | 12/1981 | Heath | B01D 3/205 202/158 |
| 4,673,464 | A * | 6/1987 | Zeitsch | B01D 3/22 202/158 |
| 5,265,428 | A * | 11/1993 | Valencia | B01D 3/18 202/158 |
| 6,189,872 | B1 * | 2/2001 | Chuang | B01D 3/163 261/114.3 |
| 6,558,515 | B1 | 5/2003 | Steacy | |
| 8,562,792 | B2 | 10/2013 | King et al. | |
| 9,233,317 | B2 * | 1/2016 | Alzner | B01D 53/18 |
| 9,320,983 | B2 * | 4/2016 | Giese | B01D 3/163 |
| 2010/0221156 | A1 * | 9/2010 | Maleta | B01D 3/163 422/607 |
| 2012/0103013 | A1 | 5/2012 | King | |
| 2014/0251138 | A1 * | 9/2014 | Giese | B01D 3/163 95/242 |

FOREIGN PATENT DOCUMENTS

| | | | |
|---|---|---|---|
| GB | 788075 | * | 12/1957 |
| JP | 09-510395 | | 10/1997 |
| KR | 10-1997-0032951 | | 7/1997 |
| KR | 10-2010-0022349 | | 8/2010 |
| KR | 10-1325795 | | 11/2013 |
| KR | 10-2015-0097867 | | 8/2015 |
| WO | wo02085504 a1 | * | 10/2002 |

OTHER PUBLICATIONS

Harvianto, et al., "Optimal Operation of Dividing Wall Column using Enhanced Active Vapor Distributor", Chemical Engineering Transactions, vol. 69 (2018) 6 pgs.
Long, et al. "Grid-search-and-box-search-assisted coordinate descent methodology for practical retrofit of the existing distillation columns to dividing wall columns", Chemical Engineering Research and Design (2017), 11 pgs.
Lukac, et al. "On Controllability of Four-Product Dividing Wall Columns", Chemical Engineering Transactions, vol. 69 (2018), 6 pgs.
Harvianto, et al., "Optimal operation of a dividing wall column usingan enhanced active vapor distributor", Chemical Engineering Research and Design (2019) pp. 512-519.
Korbelarova, "Modeling and Experiments for Active Vapor Split Control of a Four-product Kaibel Column", Master's thesis for Norwegian University of Science and Technology (2018) 79 pages.
Long, et al. "Chapter 4—Promising Retrofit Technologies for Multi-Column System", Springer Nature Singapore Pte Ltd. (2017) 61 pages.
Long, et al., "Process Intensification in Distillation Systems: Main Trendsfor Improving Petrochemical Process Performance", Petroleum & Petrochemical Engineering Journal (2017) 4 pages.
Ranger, et al. "Multiple Dividing-Wall Columns—Current Status and Future Prospects", Chemie Ingenieur Technik,. Wiley Online Library (2019) pp. 1-10.
Rionugroho, et al. "Benit M DWC for Presentation_190708", Benit M Mass Transfer Process, 11-13, & 15-16 pgs.
Rionugroho, et al. "Benit M DWC for Presentation_190708", Benit M Mass Transfer Process, 25-27 pgs.
Rionugroho, et al. "Benit M DWC for Presentation_190708", Benit M Mass Transfer Process, p. 24.

* cited by examiner (a)

(b)

VAPOR SPLITTER AND METHOD FOR ADJUSTING VAPOR SPLIT RATIO

CROSS REFERENCE TO RELATED APPLICATION

This is a 35 U.S.C. § 371 application of, and claims priority to, International Application No. PCT/KR2017/000554, which was filed on Jan. 17, 2017, and claims priority to KR Patent Application No. 10-2016-0059661, which was filed on May 16, 2016, and to KR Patent Application No. 10-2016-0133521, which was filed on Oct. 14, 2016, the teachings of the applications of which are incorporated herein by reference.

TECHNICAL FIELD

The present invention relates to a vapor splitter and a method for adjusting a vapor split ratio in an apparatus such as a dividing wall column that adjusts vapor split ratios with respect to different sections.

BACKGROUND ART

Typically, a column is industrially used as an apparatus for distillation, absorption, or cooling in petroleum, oil refinery, chemistry, and fine chemistry industries or for removal of toxic gases or organic substances. The column separates, absorbs, or condenses separable components through gas-liquid contact.

Recently, as a system for fractionating two or more components from each other, a dividing wall column (also called divided wall column or partitioned distillation column) is used to save energy and capital cost. A dividing wall column has a structure combining functions of two or more different columns. The side as well as the top and bottom of the diving wall column are provided with one or more discharge holes. The dividing wall column is characterized to be equipped with one or more internal vertical walls which divide the internal space into two or more sections. In the dividing wall column, liquid flowing down from above the dividing walls needs to be split as desired into different sections divided by the walls. When the liquid is split, a liquid splitter is used to adjust a liquid split ratio.

However, the conventional dividing wall column for distillation, absorption, or cooling has a problem that it can control only a liquid split ratio but cannot control a vapor split ratio.

To address this problem, according to a conventional method of determining a vapor split ratio, the vapor split ratio is fixed at the designing stage according to the size of a chimney on a chimney tray through which vapor or gas can pass. The vapor split ratio determined according to the size of the chimney is unchangeable with operation conditions. Therefore, it was difficult to satisfactorily accomplish the energy saving effect that is the advantage of the dividing wall column.

According to another conventional method of adjusting a vapor split ratio, gas in a lower space of a column is prevented from rising to an upper space through the column, but the gas is indirectly guided to the upper space via a pipeline disposed outside the column and connected to the upper space of the column. In this case, the flow of the gas is controlled by a valve installed on the pipeline disposed outside the column. This method is problematic in that it requires a large installation space and suffers high pressure loss attributable to the valve.

According to a further conventional method of adjusting a vapor split ratio, a perforated plate is installed on a gas flow path, and a liquid layer is provided on the perforated plate to cause the gas to pass through the liquid layer. In this case, the height of the liquid surface is changed to control the flow resistance by which the vapor split ratio can be adjusted. However, this method is disadvantageous in terms of entrainment that occurs when the gas passes through the liquid layer. The entrainment negatively affects operation performance of a distillation column.

There are conventional arts related to the present invention: Korean Patent Application Publication No. 2010-0092349 (titled "Division Wall Column Characterized By That Pressure In Dichotomous Spaces Is Substantially Equivalent"); and U.S. Pat. No. 8,562,792 B2 (titled "Vapor And Liquid Flow Control In A Dividing Wall Fractional Distillation Column").

DOCUMENT OF RELATED ART

Patent Document (Patent Document 1) Korean Patent Application Publication No. 2010-0092349
(Patent Document 2) U.S. Pat. No. 8,562,792

DISCLOSURE

Technical Problem

Accordingly, the present invention is to solve problems occurring in related arts and an object of the present invention is to provide a vapor splitter having a simple structure and easily adjusting vapor split ratios with respect to different sections or spaces.

Another object of the present invention is to provide a vapor splitter that can easily change a vapor split ratio in accordance with operation conditions of a system during operation of the system and can precisely and continuously control the vapor split ratio.

A further object of the present invention is to provide a method for adjusting a vapor split ratio using the vapor splitter.

Technical Solution

In order to accomplish the above object, the present invention provides a vapor splitter including:

a chimney tray dividing an internal space of a housing into an upper space and a lower space;

a chimney provided on an upper surface of the chimney tray such that the upper space and the lower space communicate with each other through the chimney;

a cap including a top plate and a side wall extending from the top plate, the cap being fixed outside the chimney with a distance from the chimney, the cap covering the chimney such that a gas discharge hole is formed so that gas, coming out through a hole in an upper end of the chimney, is discharged to the upper space through the gas discharge hole;

a liquid feeding unit for feeding liquid to the upper space of the housing; and a liquid discharging unit for discharging the liquid from the upper space of the housing, wherein the size of the gas discharge hole is adjusted by adjusting the height of the liquid collected on the chimney tray by using either one or both of the liquid feeding unit and the liquid discharging unit.

The gas discharge hole includes:

(a) only one or more holes formed in the cap;

(b) one or more holes formed by one or more recesses provided at a lower end of the side wall of the cap when the lower end of the side wall of the cap is fixed to the upper surface of the chimney tray;

(c) a space defined by the cap and the chimney in a state in which the side wall is not in contact with the upper surface of the chimney tray;

(d) a space defined by the cap, the chimney, and the upper surface of the chimney tray in a state in which a portion of the side wall is in contact with the upper surface of the chimney tray; or (e) a combination of the gas discharge hole of the item (b), (c), or (d) and one or more gas discharge holes formed in the top plate or the side wall of the cap.

The gas discharge hole has a shape selected from the group consisting of a circular shape, an oval shape, a polygonal shape, a doughnut shape, and a slit shape.

The side wall of the cap extends from the top plate such that the shortest portion of the side wall when measured from the top plate extends to a position lower than the lowest portion of the upper end of the chimney.

The gas discharge hole is formed in the side wall of the cap, and the highest end of the gas discharge hole is lower than the lowest portion of the upper end of the chimney.

The cap may be fixed to the housing or the chimney by a fixing member, or in a manner that a portion of the lower end or the entire lower end of the side wall is in contact with the upper surface of the chimney tray.

The top plate of the cap is provided with a flow channel to guide a liquid flow, and the flow channel and the gas discharge hole may be formed in different directions.

The liquid feeding unit may be any one kind selected from the group consisting of a nozzle, a valve, a perforated plate, a downcomer, a tray, a packing, a spray device, a gas-liquid contact device, and a gas condenser, or may be any combination of two or more kinds selected from the group.

The liquid discharging unit may be any one kind selected from the group consisting of a nozzle, a valve, a perforated plate, and a downcomer, or any combination of two or more kinds selected from the group.

The liquid discharging unit may be a flow rate adjustment valve installed in the chimney tray, and the flow rate adjustment valve may include a fixed body, a rotating body, and a valve adjusting member. The fixed body is provided with a first communication hole extending in a longitudinal direction and first flow rate adjustment holes communicating with the first communication hole and being respectively open to the upper space and the lower space. The rotating body is rotatably installed in the first communication hole. The rotating body is provided with a second communication hole extending in the longitudinal direction, and second flow rate adjustment holes that selectively communicate with the first flow rate adjustment holes according to a rotation operation of the rotating body. The valve adjusting member is connected to an end of the rotating body and is used to rotate the rotating body.

The first flow rate adjustment holes may be long holes linearly extending in the longitudinal direction of the fixed body or obliquely extending with respect to the longitudinal direction of the fixed body. Alternatively, the first flow rate adjustment holes may be a plurality of circular holes, rectangular holes, or oval holes arranged at predetermined intervals in the longitudinal direction or the oblique direction of the fixed body. Further alternatively, the first flow rate adjustment holes may be a mixture of these holes.

The second flow rate adjustment holes may be long lines linearly extending in the longitudinal direction of the rotating body or obliquely extending with respect to the longitudinal direction of the rotating body. Alternatively, the second flow rate adjustment holes may be a plurality of circular holes, rectangular holes, or oval holes arranged at predetermined intervals in the longitudinal direction or the oblique direction of the rotating body. Further alternatively, the second flow rate adjustment holes may be a mixture of these holes.

The second communication hole and the second flow rate adjustment holes formed in the rotating body may be continuous holes continuously extending in the longitudinal direction of the rotating body while passing through the rotating body from the upper end the lower end, or may be discrete holes that are separated from each other in the longitudinal direction while passing through the rotating body from the upper end to the lower end.

The valve adjusting member may be any one kind selected from the group consisting of a manual valve, an oil hydraulic valve, an electric valve, a hydraulic valve, and a gear or any combination of these.

The vapor splitter may be used in a process of discharging liquid, supplied to the upper space, to an outside and discharging gas, rising from the lower space, to the upper space.

The vapor sprinter is applicable to a dividing wall column in which functions of two or more columns are combined or an apparatus for adjusting vapor split ratios with respect to two or more spaces.

In order to accomplish the objects of the present invention, according to another aspect, there is provided a method of adjusting a vapor split ratio using a vapor splitter including:

a chimney tray dividing an internal space of a housing into an upper space and a lower space;

a chimney provided on an upper surface of the chimney tray such that, the upper space and the lower space communicate with each other through the chimney; a cap including a top plate and a side wall extending from the top plate, the cap being fixed outside the chimney with a distance from the chimney, the cap covering the chimney such that a gas discharge hole is formed so that gas, coming out through a hole in an upper end of the chimney, is discharged to the upper space through the gas discharge hole;

a liquid feeding unit for feeding liquid to the upper space of the housing; and a liquid discharging unit for discharging the liquid out of the upper space of the housing, the method comprising:

discharging the liquid collected on the chimney tray in the upper space of the housing using the liquid discharging unit while feeding the liquid to the upper space using the liquid feeding unit, and adjusting a height of liquid collected on the chimney tray by using either or both of the liquid feeding unit and the liquid discharging unit, thereby adjusting a sire of the gas discharge hole.

The details related to the vapor splitter can be applied to the method as they are.

The side wall may be configured such that a lower end of the shortest portion of the side wall extending down from the top plate is positioned to be lower than an upper end of the lowest portion of the chimney.

The gas discharge hole may be formed in the side wall of the cap, and the highest end of the gas discharge hole may be lower than the upper end of the lowest portion of the chimney.

Advantageous Effects

According to the vapor splitter of the present invention, the cap that encases the chimney with a distance between the cap and the chimney is provided with one or more gas discharge holes and the size of the gas discharge holes is adjusted by adjusting the height of the liquid collected on the chimney tray. Therefore, a vapor split ratio can be very effectively adjusted.

In addition, the vapor splitter of the present invention can easily change the vapor split ratio during operation in accordance with changes in system operation conditions and can precisely and continuously control the vapor split ratio.

In addition, the vapor splitter of the present invention improves operation performance of a dividing wall column to which the vapor splitter is applied, thereby increasing energy saving efficiency.

The vapor split ratio adjustment method of the present invention has an effect of very efficiently adjusting a vapor split ratio by using the vapor splitter mentioned above.

The vapor splitter of the present invention can be used to control pressure drop such that gas, fed from a lower space of a general distillation tower, absorption tower, or reactor to an upper space, can be uniformly distributed in the upper space of the apparatus as well as used to adjust a vapor split ratio for a diving wall column. When the flow rate of gas fed from the lower space to the upper space of the apparatus changes from a predesigned flow rate, the vapor splitter of the present invention changes the pressure drop, thereby uniformly distributing the gas being present over the chimney tray.

MODE FOR INVENTION

Hereinafter, an embodiment of the present invention will be described with reference to the accompanying drawings. In the following description of the present invention, detailed descriptions of known functions and components incorporated herein will be omitted when it may make the subject matter of the present invention unclear.

The following descriptions and accompanying drawings illustrate specific embodiments to help those skilled in the art to easily use an apparatus and method of the invention. Other embodiments may further include structural and logical changes. Individual elements and functions are optional unless the context clearly indicates otherwise, and the sequence of processes can be changed. Some portions and features of an embodiment can be incorporated into other embodiments or replaced with those in other embodiments.

Figure 1:
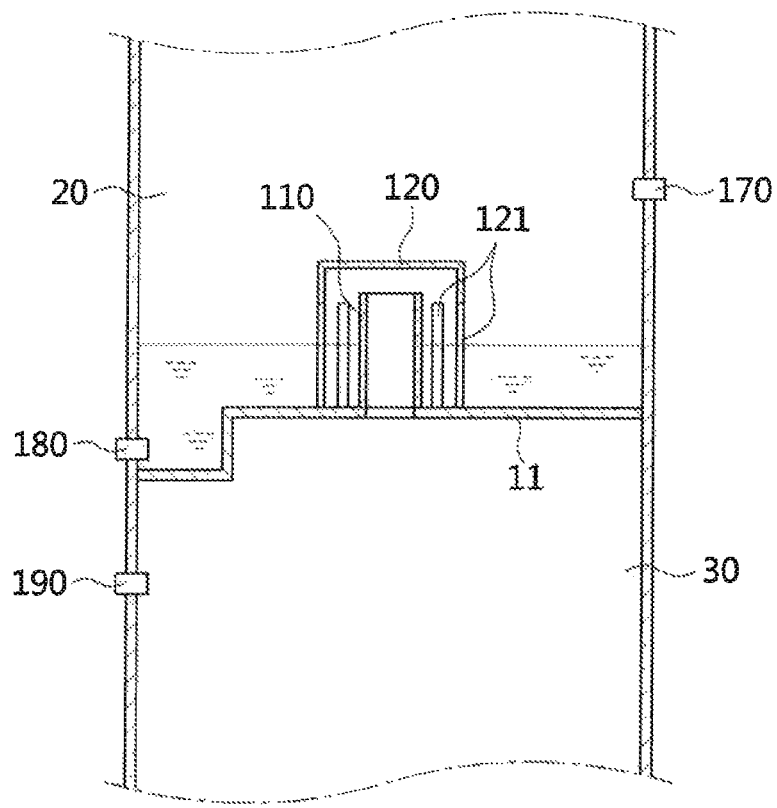
FIG. 1 is a cross-sectional view schematically illustrating a vapor splitter of the present invention.

As illustrated in FIG. 1, a vapor splitter of the present invention includes: a chimney tray 11 dividing an internal space of a housing 10 that needs to be equipped with the vapor splitter into an upper space 20 and a lower space 30; a chimney 110 that is provided on the chimney tray 11 to enable the upper space and the lower space to communicate with each other through the chimney 110; a cap 120 including a top plate and a side wall extending from the top plate, the cap being fixedly installed outside the chimney and spaced from the chimney, the cap covering an outer surface of the chimney in such a way that a gas discharge hole is formed such that gas, coming out through a hole formed in an upper end of the chimney, is discharged to the upper space through the gas discharge hole; a liquid feeding unit 170 for feeding liquid to the upper space of the housing; and a liquid discharging unit 180 for discharging the liquid out of the upper space of the housing.

In the vapor splitter, the size of the gas discharge hole is adjusted by adjusting the height of the liquid collected on the chimney tray 11, using either one or both of the liquid feeding unit 170 and the liquid discharging unit 180.

The shape of the housing 10 is not specifically limited as long as a requirement that the housing 10 has two divided spaces is satisfied.

The distance or gap between the cap 120 and the outer surface of the chimney is not specifically limited as long as a requirement that gas, coming out through the hole in the upper end of the chimney, can be discharged to the upper space through the gas discharge hole is satisfied.

The gas discharge hole may be provided in the form of:

(a) only one or more holes formed in the side wall or top plate of the cap;

(b) one or more holes provided by one or more recesses provided at a lower end of the side wall of the cap when the lower end of the side wall of the cap is fixed to an upper surface of the chimney tray;

(c) a space defined by the cap and the chimney in a state in which the side wall is not in contact with the upper surface of the chimney tray;

(d) a space defined by the cap, the chimney, and the upper surface of the chimney tray in a state in which a portion of the side wall is in contact with the upper surface of the chimney tray; or (e) a combination of the gas discharge hole of the item (b), (c), or (d) and one or more holes formed in the top plate or the side wall of the cap.

Figure 2:
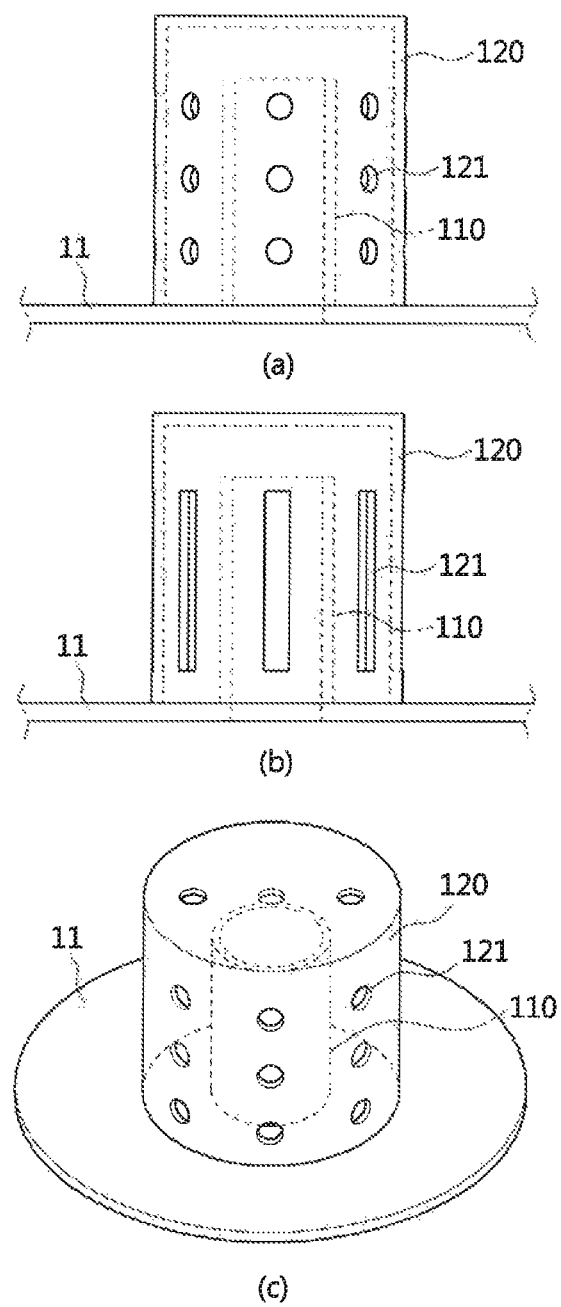
FIGS. 2 to 6 are cross-sectional views illustrating various arrangements of a cap, a chimney, and a chimney tray that are components of a vapor splitter of the present invention.

The gas discharge hole 121 defined in item (a) is illustrated in FIG. 2. The gas discharge hole 121 consists of only one or more holes formed in the top plate and the side wall of the cap 120. That is, the gas discharge hole 121 defined in item (a) is formed by a structure in which the entire lower end of the side wall of the cap 120 is fixed to the upper surface of the chimney tray 11 and the side wall and/or the top plate of the cap is/are provided with gas discharge holes.

The shape of the one or more gas discharge holes provided in the top plate and the side wall of the cap 120 is not specifically limited. It may be any shape, for example, a circular shape, an oval shape, a polygonal shape, or a slit shape.

Positions of the one or more gas discharge holes provided to the cap 120 are not specifically limited. The positions of the gas discharge holes can be properly determined as necessary.

For example, when the gas discharge hole is near the upper surface of the chimney tray 11, a vapor split ratio can be easily adjusted with a small amount of liquid because the height of the liquid on the chimney tray can be easily changed even with a small amount of liquid.

In addition, it is preferable that the gas discharge hole is formed in the side wall of the cap 120, specifically at a position lower than the upper end of the chimney, in terms of a broader adjustment range. When the gas discharge hole is formed at a position higher than the upper end of the chimney 110, the size of the gas discharge hole cannot be controlled in accordance with the height of the liquid and thus the vapor split ratio cannot be adjusted in accordance with the height of the liquid because the height of the liquid surface cannot be increased to be higher than the upper end of the chimney 110.

Figure 3:
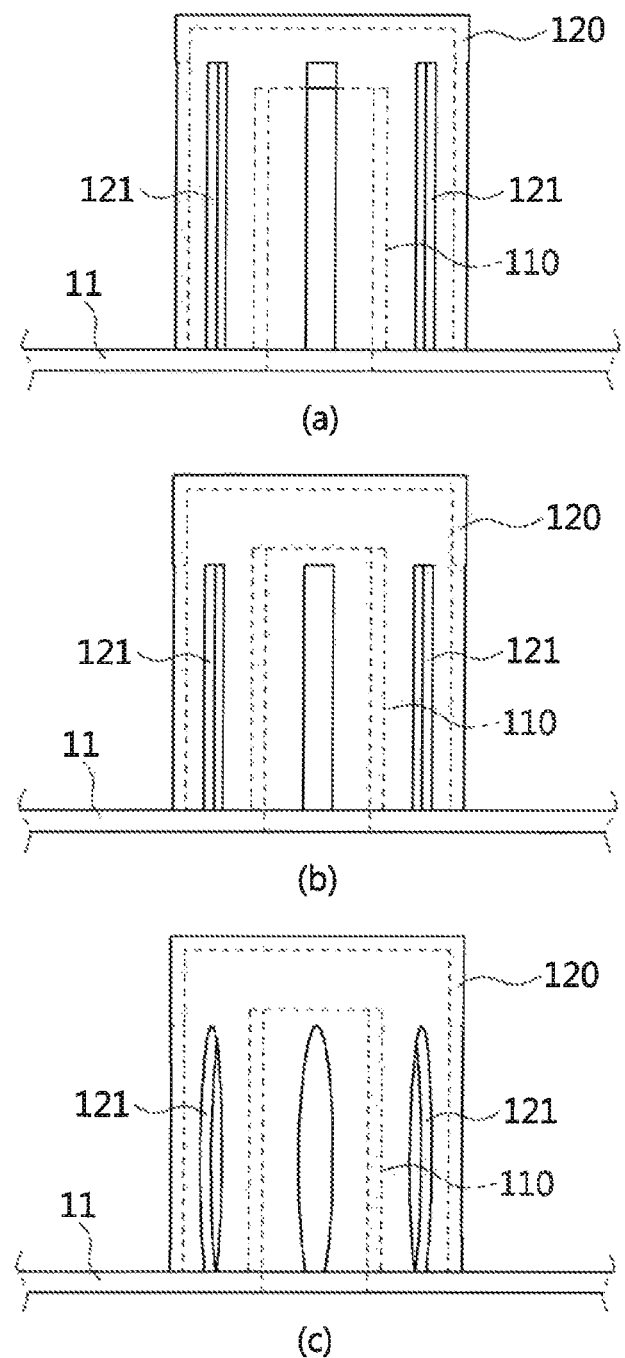

The gas discharge hole defined in item (b) is illustrated in FIG. 3. The gas discharge hole consists of one or more holes that are formed by one or more recesses formed at the lower end of the side wall of the cap 120 when the lower end of the cap 120 is combined with the upper surface of the chimney tray 11. That is, the lower end of the side wall of the cap 120 is provided with the recesses, and the gas discharge holes 121 are defined by the recesses and the upper surface of the chimney tray 11.

It is preferable that the gas discharge hole is formed at a position lower than the upper end of the chimney in terms of a broader adjustment range. That is, when the position of the gas discharge hole is higher than the upper end of the chimney, the height of the liquid surface cannot be increased to be higher than the upper end of the chimney. Therefore, the vapor split ratio cannot be adjusted in accordance with the height of the liquid.

Figure 4:
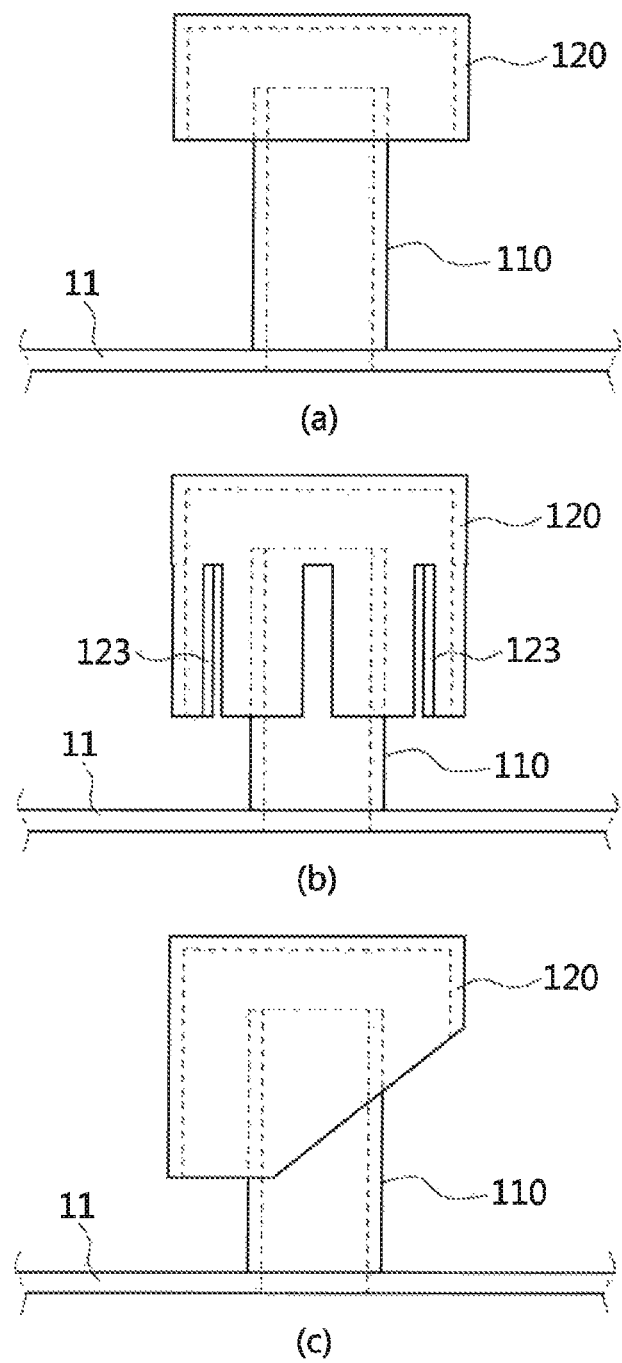

The gas discharge hole defined in item (c) is illustrated in FIG. 4. This gas discharge hole is determined by the space between the cap and the chimney in the assembled structure of the cap and the chimney, in which the side wall of the cap 120 is not in contact with the upper surface of the chimney tray 11. That is, the length of the side wall of the cap 120 is so snort that the lower end of the side wall cannot reach the upper surface of the chimney tray 11 and the gas discharge hole 121 is formed, by the gap between the side wall of the cap and the chimney.

In this case, the shortest portion of the side wall of the cap measured from the top plate needs to extend to a position lower than the lowest portion of the upper end of the chimney. With this structure, it is possible to properly adjust the vapor split ratio and broaden the adjustment range of the vapor split ratio. When the lower end of the shortest portion of the side wall of the cap is positioned to be higher than the upper end of the lowest portion of the chimney, the height of the liquid surface cannot be increased to be higher than the lowest portion of the upper end of the chimney. Therefore, the vapor split ratio cannot be properly adjusted in accordance with the height of the liquid surface.

In this case, the form of the gas discharge hole may further include a recess that is termed in the lower end of the side wall of the cap and which has a circular shape, an oval shape, a polygonal shape, or a slit shape.

Figure 5:
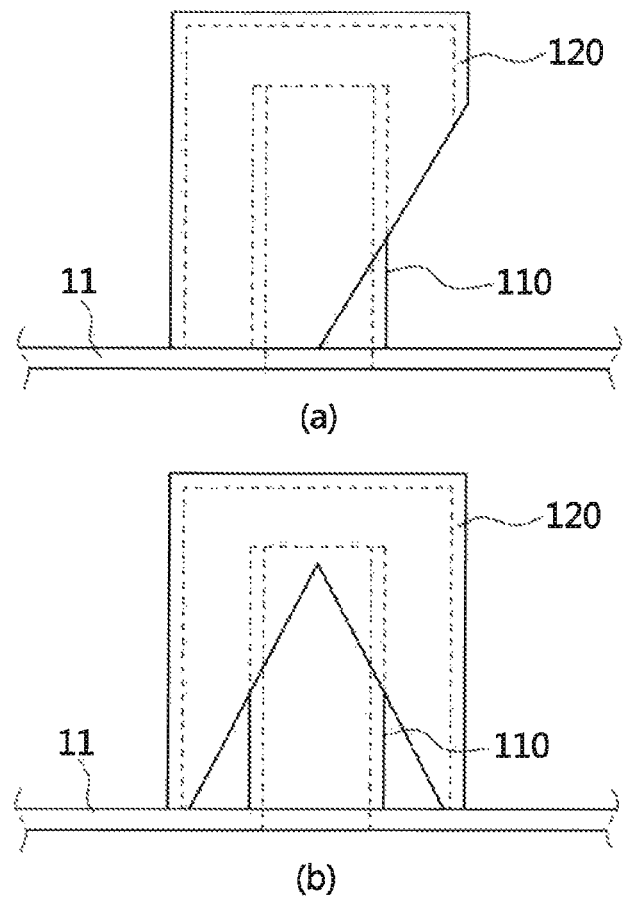

The gas discharge hole defined in item (d) is illustrated in FIG. 5. The side wall of the cap is partially in contact with the upper surface upper surface of the chimney tray. The gas discharge hole is formed by a space defined by the cap, the chimney, and the upper surface of the chimney tray that are assembled with each other. That is, the side wall of the cap 120 is partially in contact with the upper surface of the chimney tray 11. Thus, the space defined by a portion of the lower end of the side wall, which is not in contact with the upper surface of the chimney tray, the upper surface of the chimney tray, and the chimney, serves as the gas discharge hole 121.

Figure 6:
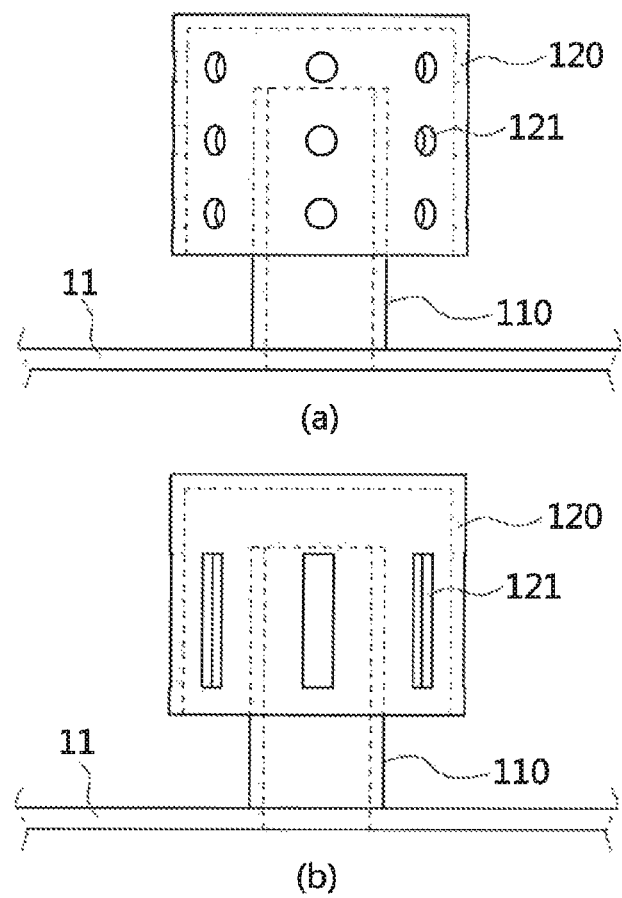

The gas discharge hole defined in item (e) is illustrated in FIG. 6. This gas discharge hole includes the gas discharge hole of item (b), (c), or (d) and one or more holes formed in the top plate or the side wall of the cap. The gas discharge holes formed in the top plate or the side wall of the cap have one or more shapes selected from the group consisting of a circular shape, an oval shape, a polygonal shape, and a slit shape.

Figure 7:
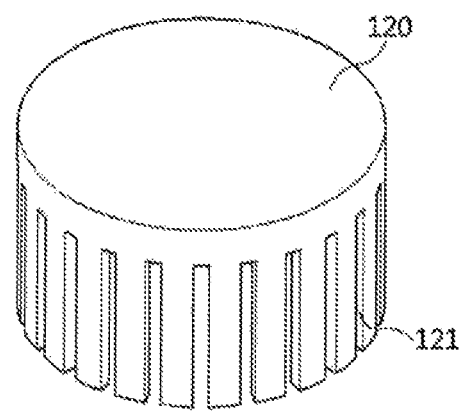
FIG. 7 is a perspective view of the cap of the vapor splitter of the present invention.
Figure 7:
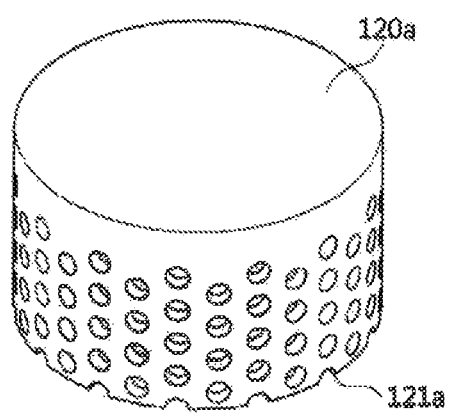

FIG. 7 illustrates examples of the cap 120 of the vapor splitter according to one embodiment of the present invention. In the present invention, the shape of the cap is not specifically limited if the cap can provide the gas discharge hole. For example, the side wall of the cap may be provided with holes or slit-like recesses, or may be partially cat oat in an oblique direction.

In the present invention, the shape of the chimney 110 is not specifically limited if the chimney 110 can transfer the gas from the lower space to the upper space. There may be one or more chimneys 110 provided on the chimney tray 11.

Figure 14A:
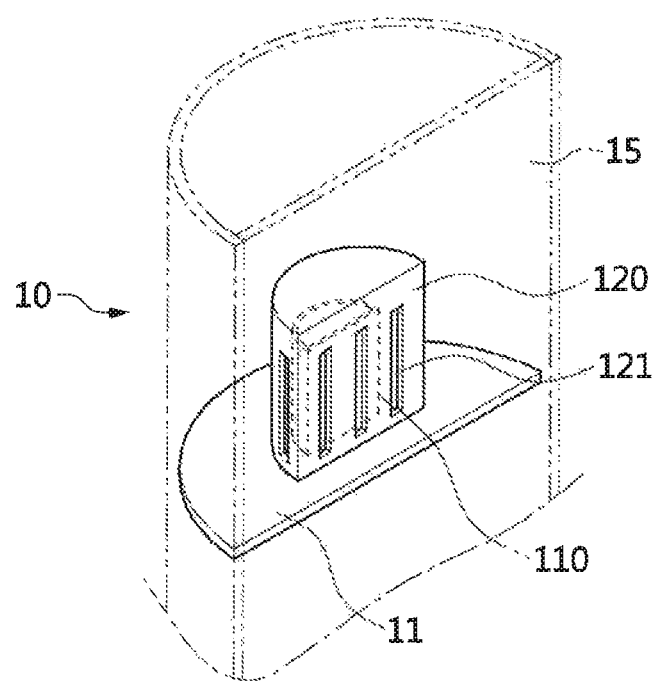
FIGS. 14A, 14B, and 14C are perspective views illustrating various vapor splitters that can be provided by the present invention.
Figure 14B:
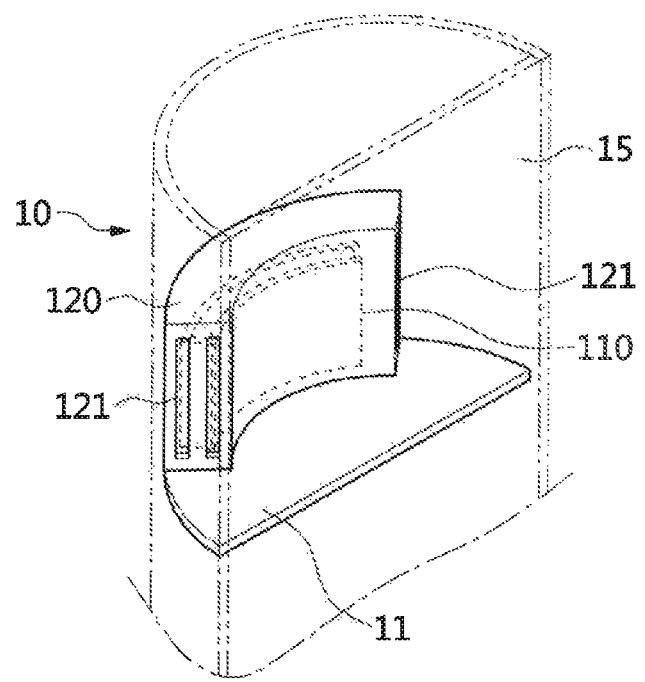
Figure 14C:
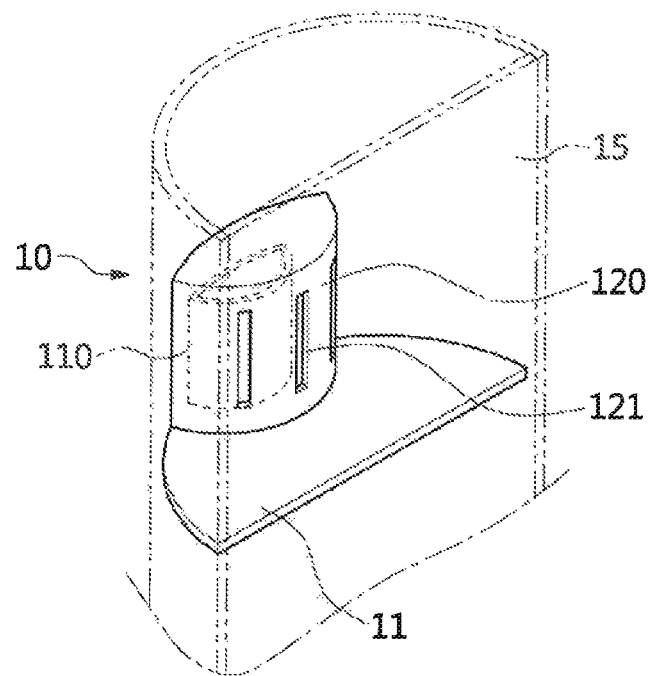

FIGS. 14A, 14B, and 14C illustrate various vapor splitters according to embodiments of the present invention.

In the vapor splitter of the present invention, the gas discharge hole may be formed, in the top plate of the cap. However, in the case where the gas discharge hole is formed in the top plate of the cap, liquid dropping from an upper side of a column is likely to pass through the gas discharge hole. At this point, the liquid may collide with the gas passing out through the gas discharge hole, thereby causing entrainment. Therefore, in this case, a hat is preferably provided to prevent this problem.

In the vapor splitter of the present invention, the cross-sectional shapes of the chimney and the cap are not specifically limited. They may be a circular shape, an oval shape, or a polygonal shape.

The cap is fixed to the housing or the chimney via a fixing member. Alternatively, the cap is fixed in a manner that the lower end of the side wall of the cap is entirely or partially fixed to the upper surface of the chimney tray.

The top plate of the cap is provided with a flow channel that guides a liquid flow, and the flow channel and the gas discharge hole are formed preferably in different directions.

In the vapor splitter of the present invention, any known liquid feeding means can be used as the liquid feeding unit 170. For example, a nozzle, a valve, a perforated plate, a downcomer, a tray, a packing, a spray device, a gas-liquid contact device, or a gas condenser can be used as the liquid feeding unit 170. Alternatively, any combination of these may be used as the liquid feeding unit 170. Aside from these, the liquid feeing unit 170 may not be a special device, but any structure, by which liquid can be naturally fed, can be used as the liquid feeding unit of the present invention.

In the vapor splitter of the present invention, any known liquid discharging means can be used as the liquid discharging unit 180. For example, the liquid discharging unit may be a nozzle, a valve, a perforated plate, or a downcomer. Alternatively, any combination of these may be used as the liquid discharging unit.

The height of the liquid collected on the chimney tray can be adjusted, using the liquid discharging unit, in the following way: (1) selectively opening multiple nozzles provided to the side wall and arranged at different heights; 2) installing a nozzle in a relatively lower portion of the chimney tray and installing a valve in the nozzle to adjust a liquid discharge amount; 3) directly installing a valve on the chimney tray; 4) installing a plurality of perforated plates in a relatively lower portion of the chimney tray, dividing a space below the perforated plates into a plurality of divided sections, installing on/off valves in the divided sections, and selectively opening the on/off valves; and 5) installing a downcomer extending downward from the chimney tray and a weir on the chimney tray, and changing the height of the weir.

Figure 15:
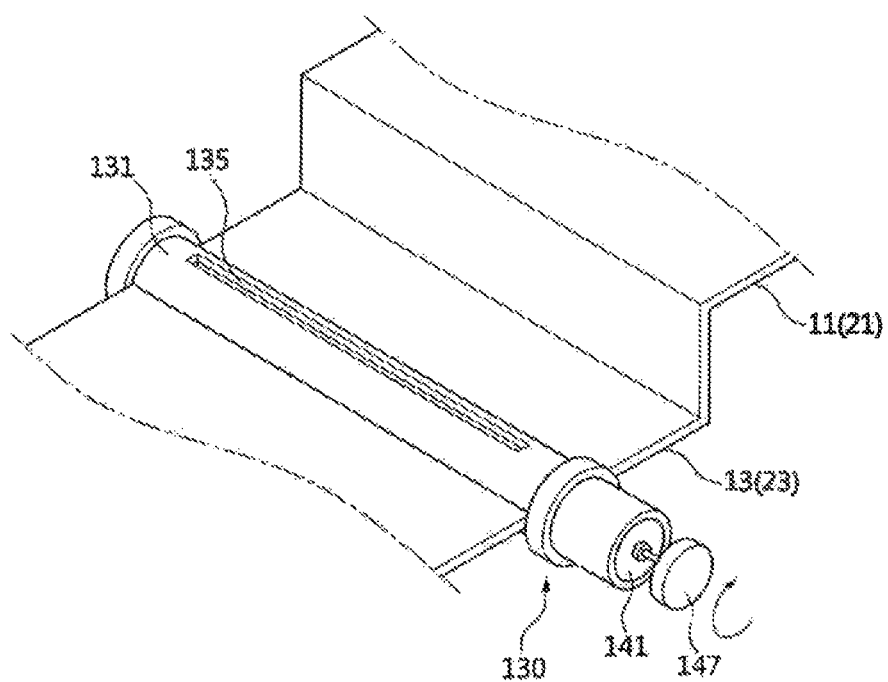
FIG. 15 is a diagram illustrating an example of a flow rate adjustment valve applicable to the vapor splitter according to one embodiment of the present invention.
Figure 16:
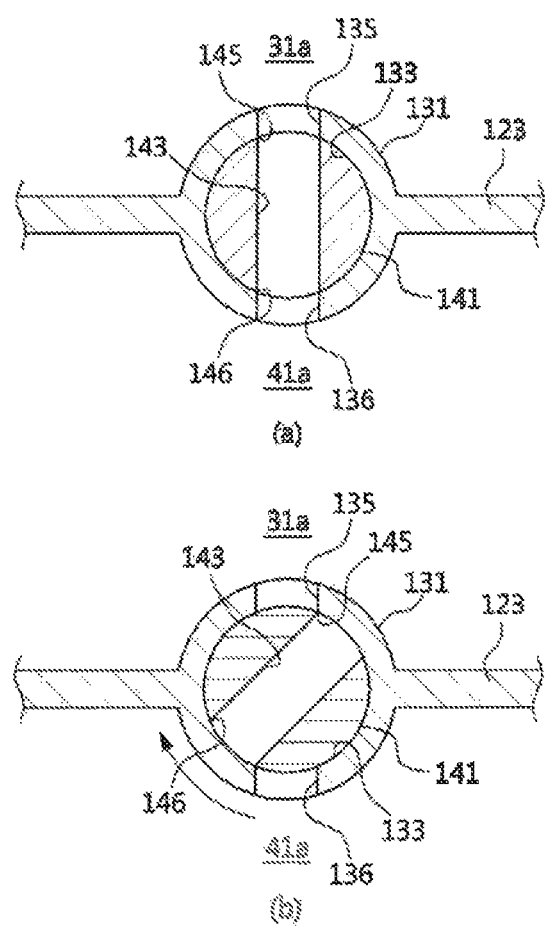
FIG. 16 is a diagram illustrating the cross section (a) and operation (b) of the flow rate adjustment valve according to one embodiment of the present invention.
Figure 17:
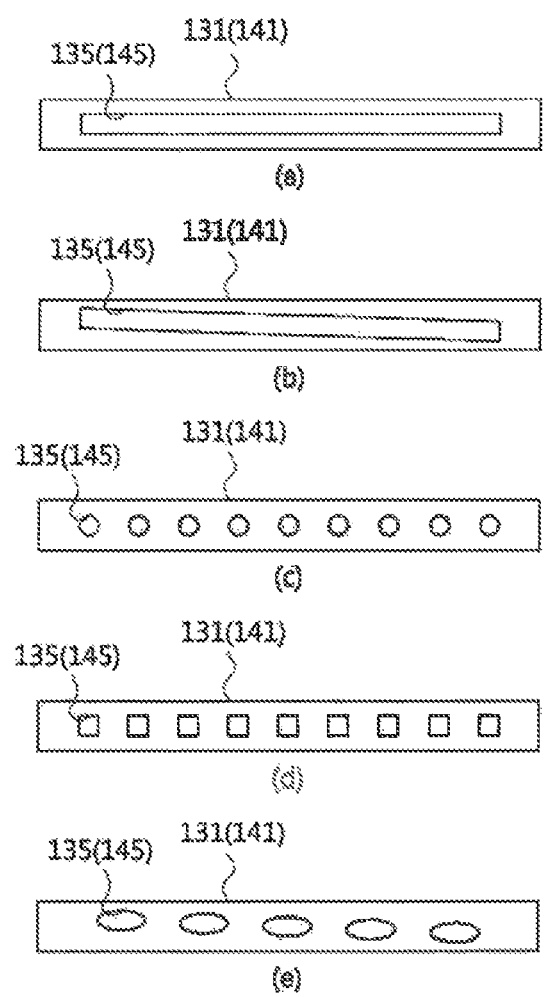
FIG. 17 is a diagram illustrating the shape of a flow rate adjustment hole of the flow rate adjustment valve according to one embodiment of the present invention.

As illustrated in FIGS. 15 to 17, the liquid discharging unit may be a flow rate adjustment valve installed on the chimney tray. The flow rate adjustment valve includes a fixed body provided with a first communication hole extending in a longitudinal direction thereof and first flow rate adjustment holes communicating with the first communication hole and being respectively open to the upper space and the lower space.

The flow rate adjustment valve further includes a rotating body rotatably installed in the first communication hole. The rotating body is provided with a second communication hole extending in the longitudinal direction, and second flow rate adjustment holes that selectively communicate with the first flow rate adjustment holes and the second communication hole according to a rotation operation of the rotating body.

The flow rate adjustment valve still further includes a valve adjusting member connected to an end of the rotating body. The valve adjusting member is used to rotate the rotating body.

The vapor splitter can be used in all hinds of systems for discharging liquid, fed into the upper space, to an outside and transferring gas, rising from the lower space, to the upper space.

The outside may be any portion disposed outside the upper space or it may be the lower space. The liquid may be transferred to the lower space after being first discharged to any portion outside the upper space.

The vapor splitter can be usually employed in a diving wall column in which functions of two or more columns are combined, or in an apparatus for adjusting a split ratio with low pressure loss when splitting a gas flow without causing entrainment.

Beside the function of adjusting the vapor split ratio, the vapor splitter can be used to control pressure drop to uniformly distribute gas, supplied from a lower space of a general distillation tower, a general absorption tower, or a general reactor, to an upper space. When an amount of gas supplied from the lower space of the apparatus is changed to be different from a designed amount, the vapor splitter of the present invention is used to change the pressure drop, thereby uniformly distributing the gas in the upper space above the chimney tray.

Next, a method of adjusting a vapor split ratio according to the present invention uses a vapor splitter including:
a chimney tray dividing an internal space of a housing that needs to be equipped with the vapor splitter into an upper space and a lower space; a chimney provided on the chimney tray to enable the upper space and the lower space to communicate with each other through the chimney; a cap including a top plate and a side wall extending from the top wall, the cap covering the chimney such that a gas discharge hole is formed so that gas, rising through a hole formed at an upper end of the chimney, is discharged to the upper space through the gas discharge hole; a liquid feeding unit for feeding liquid, to the upper space of the housing; and a liquid discharging unit for discharging the liquid out of the upper space of the housing. The method is characterized by adjusting the vapor split ratio by changing the size of the gas discharge hole by adjusting the height of the liquid on the chimney tray, using either one or both of the liquid feeding unit and the liquid discharging unit.

All of the above details described with reference to the vapor splitter can be applied to the method of adjusting the vapor split ratio. Therefore, the repetitive description will be omitted hereinafter.

The method of adjusting the vapor split ratio can be referred to as a method of adjusting a vapor distribution degree.

Hereinafter, the method of the present invention will be described taking an example in which the vapor splitter of the present invention is applied to a dividing wall column in which functions of two or more columns are combined.

Figure 8:
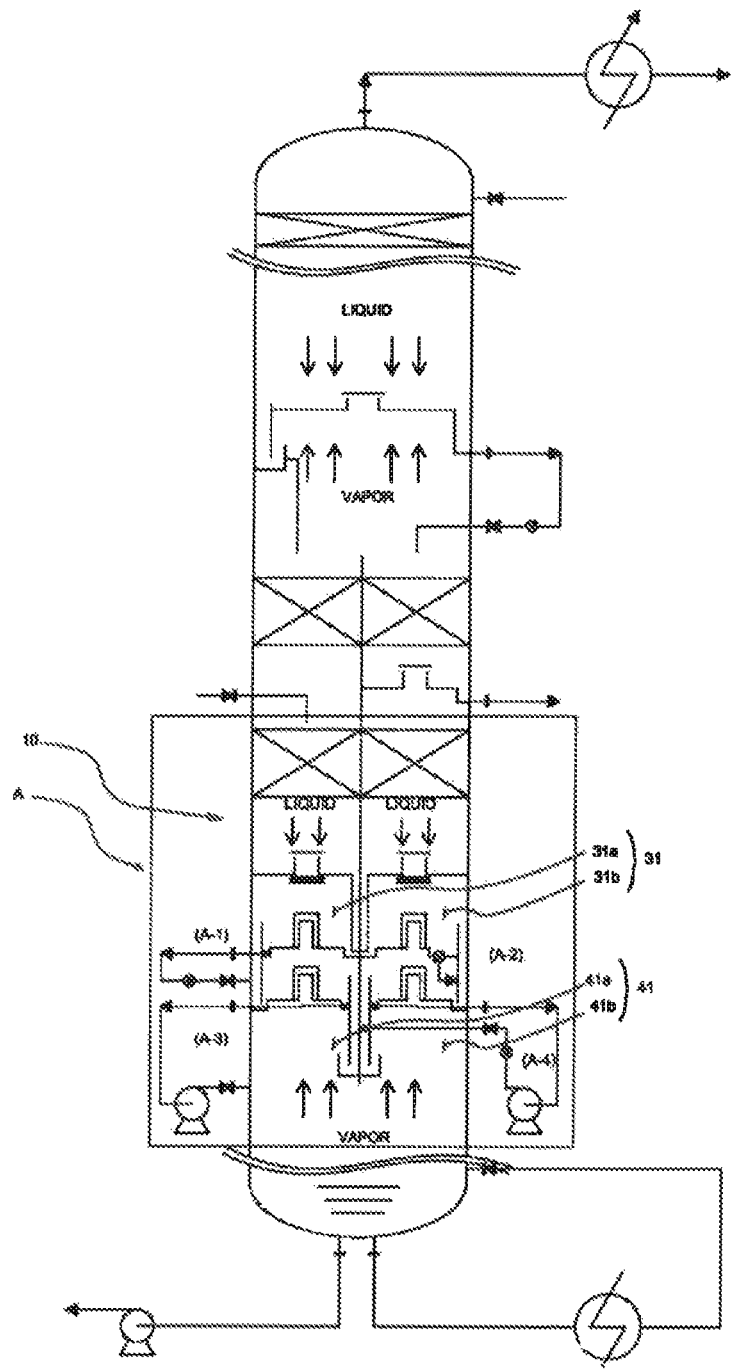
FIG. 8 is a diagram illustrating a diving wall column to which the vapor splitter according to one embodiment of the present invention is applied.
Figure 9:
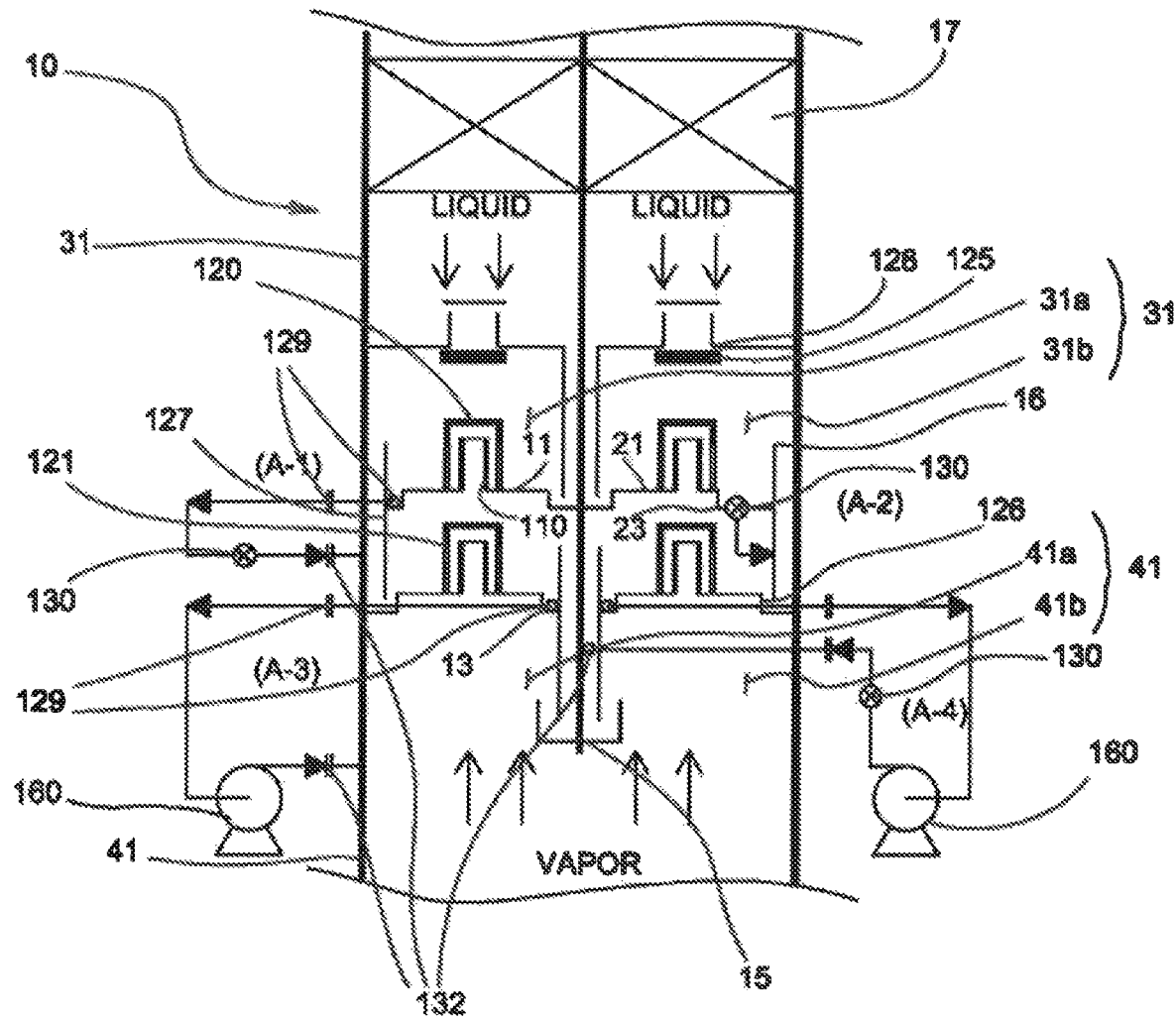
FIG. 9 is an enlarged diagram illustrating a portion A of FIG. 8 which is related to the vapor splitter according to one embodiment of the present invention.

As illustrated in FIGS. 8 and 9, the vapor splitter of the present invention guides liquid, flowing from above a first space 31, to the first space 31, and transfers gas, rising from the underside of a second space 41, to the first space 31. The gas transferred to the first space 31 may be sent to a gas-liquid contact space 17 such as a packing, a tray, or a spray space within the first space 31.

The gas-liquid contact space 17 may be a condenser that receives and condenses gas transferred to the first space 31, thereby separating the gas in the form of liquid.

The vapor splitter adjusts the height of a liquid surface on the chimney tray 11, 21, thereby adjusting an area of the space between the chimney and the cap 120 that is installed to cover the chimney while being spaced from both of the upper and side surfaces of the chimney in each section, thereby adjusting the vapor split ratio.

In FIG. 8, (A-1) shows an example in which a flow rate adjustment valve is connected to a nozzle serving as the liquid discharging unit of the vapor splitter, (A-2) shows an example in which a flow rate adjustment valve serves as the liquid discharging unit in the vapor splitter, (A-3) shows an example in which a flow rate adjustment pump is connected to a nozzle serving as the liquid discharging unit of the vapor splitter, and (A-4) shows an example in which a flow rate adjustment pump and a flow rate adjustment valve are connected to a nozzle serving as the liquid discharging unit of the vapor splitter.

These vapor splitters as well as all vapor splitters illustrated in FIGS. 2 to 6 can be applied to diving wall columns.

Figure 10A:
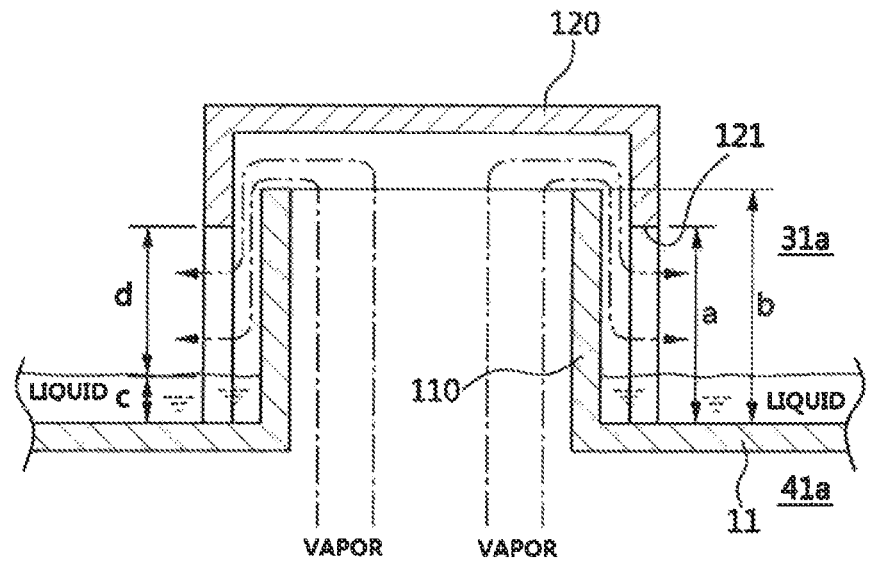
FIG. 10A illustrates a gas discharge area of the gas discharge hole through which gas is discharged from the chimney of the vapor splitter according to one embodiment of the present invention.

As illustrated in FIG. 10A, the cap 120 is installed such that the lower end thereof is not in contact with the upper surface of the chimney tray 11. The vertical size of the gas discharge hole 121, between the lower end of the cap 120 and the upper surface of the chimney tray 11, is a predetermined length "a". The length "a" is smaller than the height "b" of the chimney 110. This setting is to prevent the liquid in the first space 31 from entering into the chimney 110 through the hole 121 and also to distribute the gas while making the most of the open area of the hole.

When the height of the liquid surface is "c", the area (i.e. gas discharge area) of the gas discharge hole 121 through which the gas is discharged to the first space 31 is "d". The gas discharge area "d" is controlled by changing the height "c" of the liquid surface.

Figure 10B:
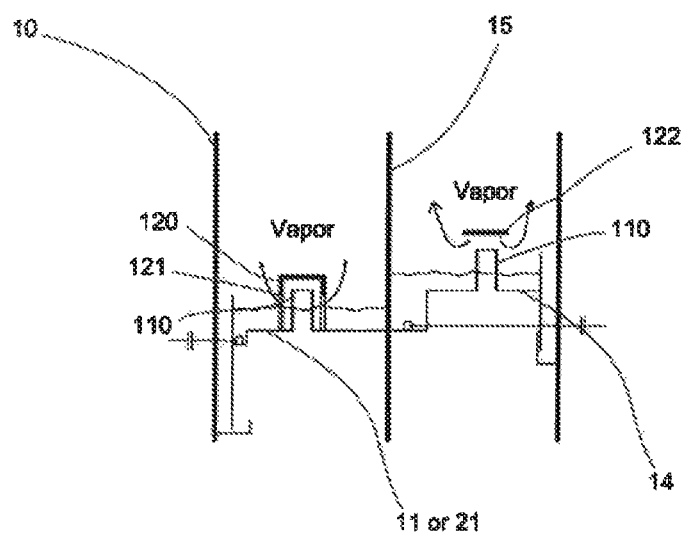
FIG. 10B illustrates an example in which the vapor splitter according to the present invention and a conventional vapor splitter are respectively installed in the first section and the second section, according to one embodiment of the present invention.

As illustrated in FIG. 10B, the chimneys 110, the caps 120, and the gas discharge holes 121 on the chimney trays 11 and 21 installed respectively in the first section and the second section may be designed identically or differently. A general chimney tray 14 and the chimney tray 11 or 21 of the present invention may be arbitrarily installed in the first section and the second section. With this design, vapor split ratios of gas into the first section and the second section can be adjusted by controlling the height of the liquid surface on the chimney tray 11 or 21 of the present invention in the way described above.

Figure 10C:
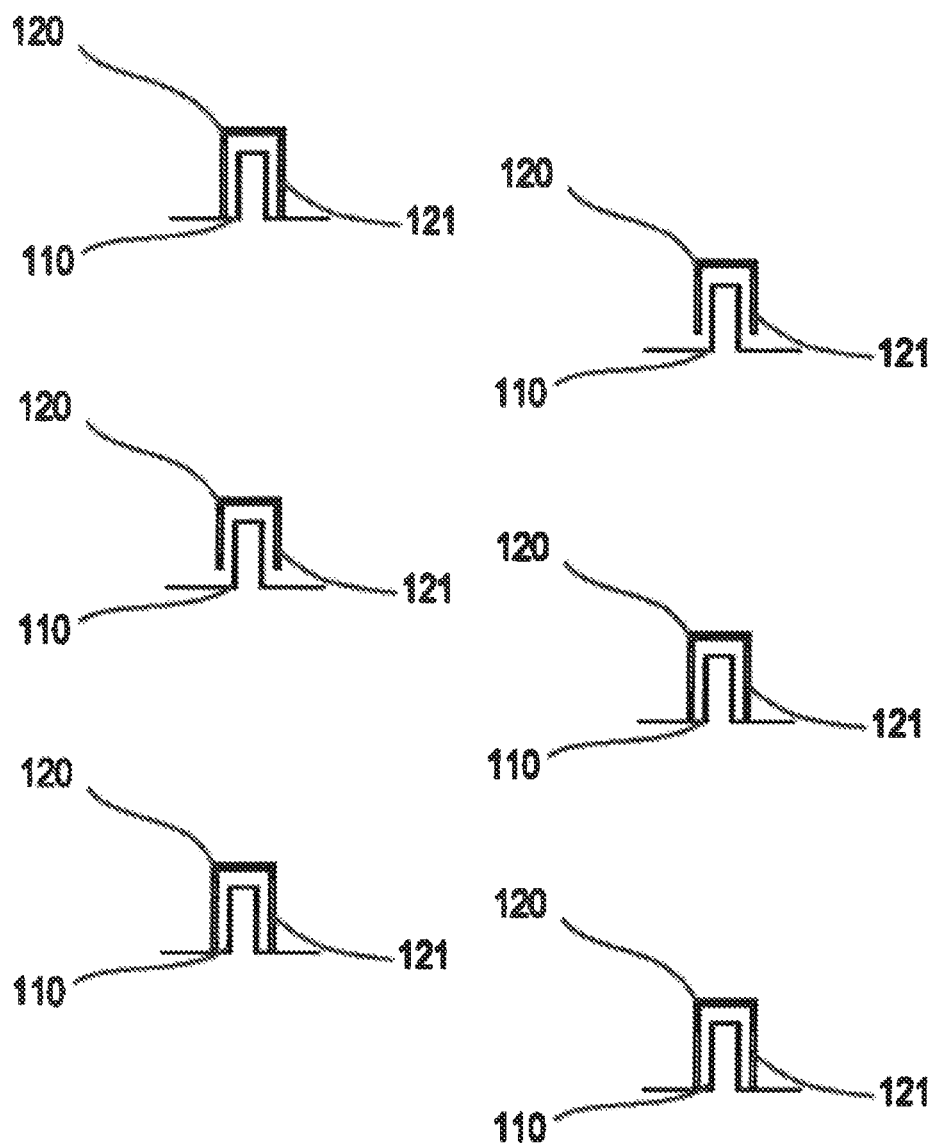
FIG. 10C is a diagram illustrating gas discharge holes provided at different heights in the vapor splitter of the present invention.

As illustrated in FIG. 10C, the height (length) of the gas discharge hole 121 may diversely vary.

As illustrated in FIG. 3, the vapor splitter of the present invention may further include a vertical diving wall 15 dividing the first space 31 or a combination of the first space 31 and the second space 41 into first sections 31a and 41a and second sections 31b and 41b.

In this case, a set of the chimney 110 and the cap 120 is installed on the chimney tray 11 dividing the first space 31 into the first section 31a and the second section 31b and a set of the chimney 110 and the cap 120 is installed on the chimney tray 21 dividing the second space 41 into the first section 41a and the second section 41b. Alternatively, a set of the chimney 110 and the cap 120 may be installed on either one of the chimney trays 11 and 21.

Alternatively, the second space 41 may not be divided into the first section 41a and the second section 41b, but remain as one space.

The chimney tray 11 is provided with a downcomer 127 serving as the liquid discharging unit. In this case, the height of the liquid surface on the chimney tray 11 is adjusted by changing the height of a weir 16 on the chimney tray 11 within the first space 31.

An upper end of the weir 16 is lower than the upper end of the chimney 110 but higher than the highest end of the gas discharge hole 121 provided to the cap 120, thereby adjusting the vapor split ratio within a maximum range of 1%:100%.

In addition, a downcomer sealing structure is installed such that a lower end of the downcomer 127 is disposed to be lower than the liquid surface in the second space 41 whereby it is possible to prevent gas from rising along the downcomer.

The downcomer 127 and the weir 16 may have a plate shape or a pipe shape.

Figure 11A:
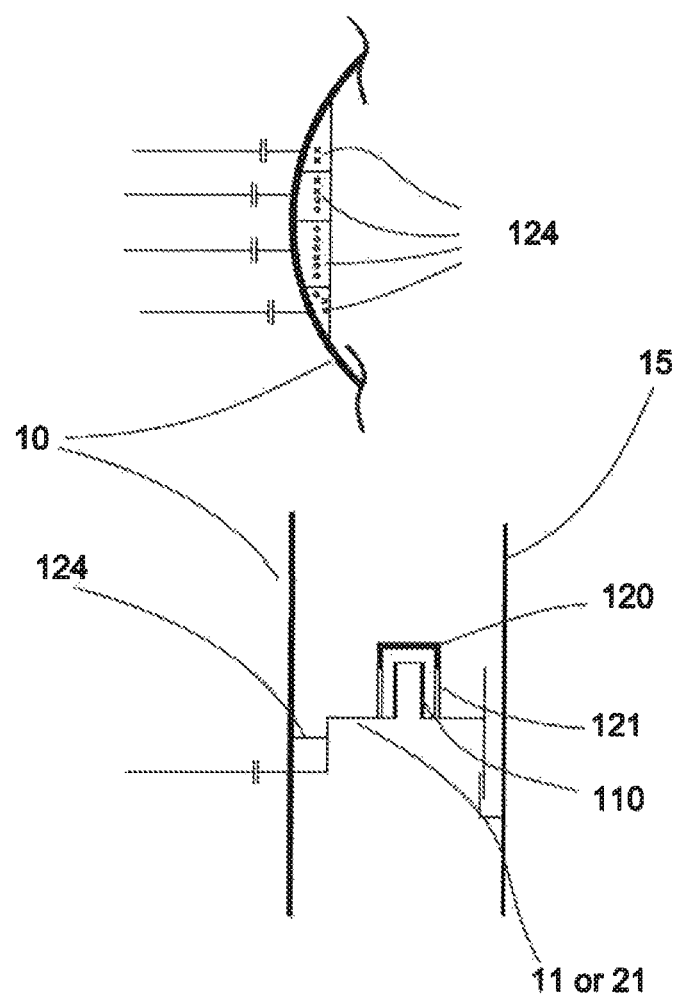
FIGS. 11A, 11B and 11C are diagrams illustrating various liquid discharging units that can be applied to the vapor splitter of the present invention.
Figure 11B:
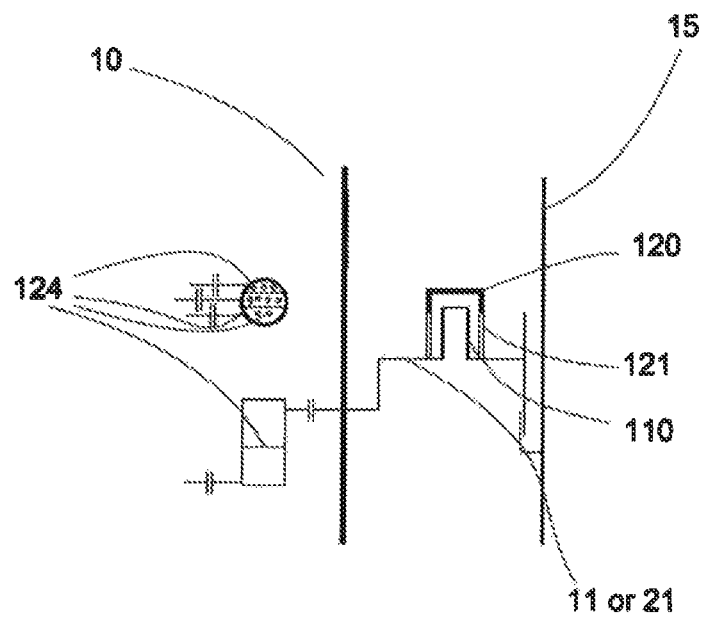

In addition, as illustrated in FIG. 11A, the liquid discharging unit 129 may be a perforated plate 124. The height of the liquid surface can be adjusted by means of a set of perforated plates 124 each having a different aperture area. In addition, a liquid surface adjusting means using the perforated plates may be installed outside the column as illustrated in FIG. 11b.

The flow rate adjustment valve 130 or the flow rate adjustment pump 160 adjusts the height of the liquid surface by adjusting the amount of liquid discharged out of the first space 31, thereby adjusting an open area of the gas discharge hole 121 of the cap 120, through which the gas passes.

The liquid discharging unit 123 is provided at a relatively lower portion of the chimney tray 11, 21. One or more liquid discharging units may be installed at a lower step portion 13 or 23 of a step structure.

Figure 11C:
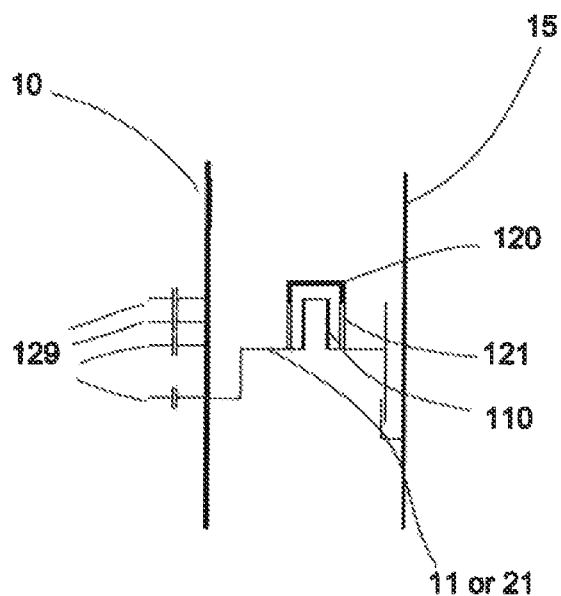

However, as illustrated in FIG. 11C, one or more liquid discharging units 129 can be installed at a predetermined height or predetermined heights for the first space. The height of the liquid surface on the chimney can be adjusted in accordance with the positron of the liquid discharging unit that is opened, or a total aperture area of the liquid discharging unit.

An entrainment preventing apparatus 125 may be installed above the vapor splitter.

Figure 12:
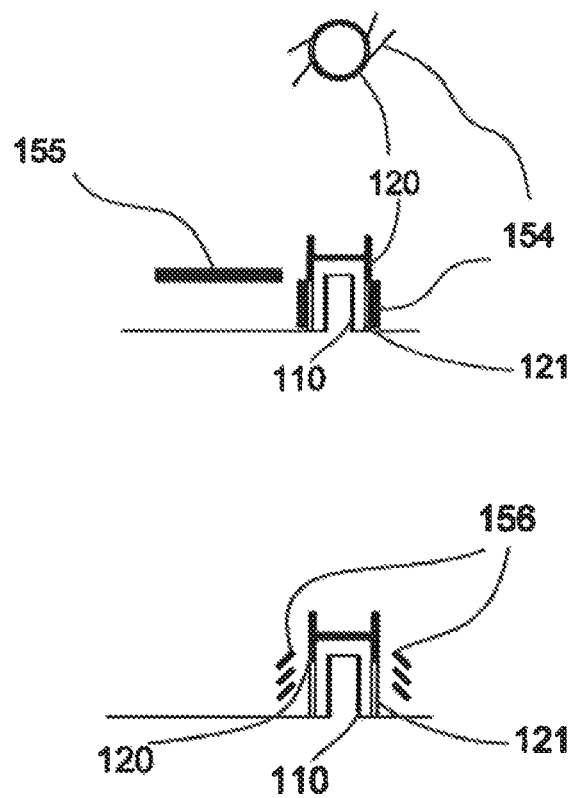
FIG. 12 is a diagram illustrating a gas flow guiding plate or a sloshing prevention plate, and a louver that can be provided around a hole of the cap.

In addition, as illustrated in FIG. 12, a gas flow guiding plate, a sloshing prevention plate 155, and a louver 156 may be installed around the hole of the cap, thereby preventing sloshing of the liquid surface on the chimney tray.

Figure 13A:
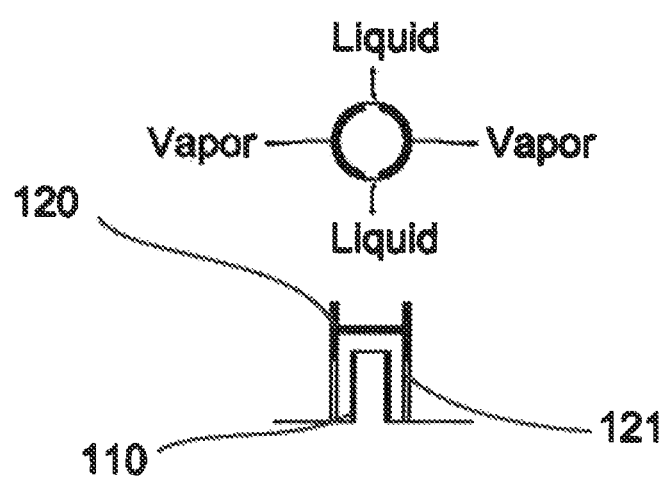
FIG. 13 illustrates various ways of forming a flow channel in an upper portion of the cap, to guide a liquid flow to prevent entrainment in the vapor splitter of the present invention.
Figure 13B:
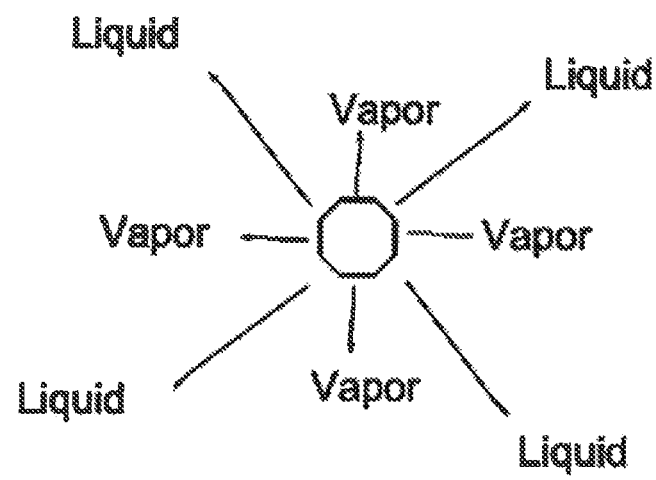
Figure 13B:
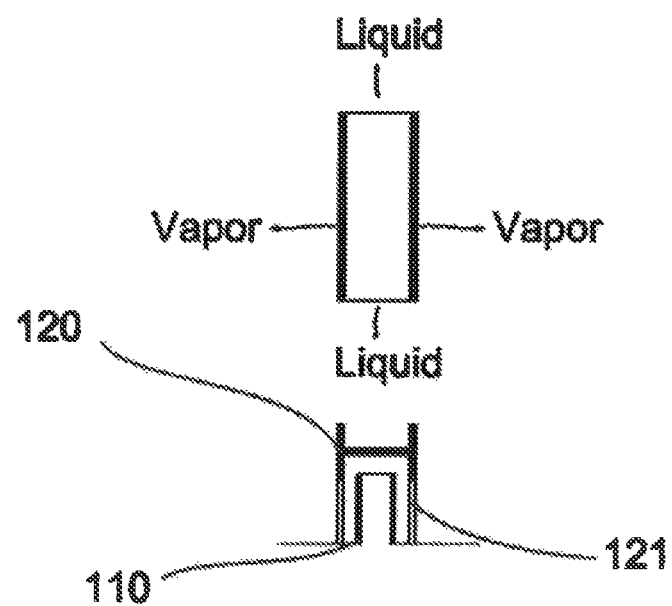

In addition, as illustrated in FIGS. 13A and 13B, the upper surface of the cap 120 is provided with a flow channel to prevent entrainment attributable to collision of the liquid falling from the upper side with the gas being discharged through the gas discharge hole 121 of the cap 120.

As the flow rate adjustment valve for adjusting the flow rate of the liquid discharged from the first space, any valve that can adjust the flow rate of liquid can be used. As illustrated in FIGS. 15 and 16, the flow rate adjustment valve 130 includes a fixed body 131, a rotating body 141, and a valve adjusting member 147. Therefore, the flow rate adjustment valve can precisely adjust the flow rate of liquid.

The fixed body 131 is an elongated cylindrical body and is integrated with a lower step portion of 13 or 23 of a step structure. The chimney trays 11 and 12 are step structures with the lower step portions 13 and 23, thereby easily controlling the height of the liquid surface.

The fixed body 131 is provided with a first communication hole 133 extending in a longitudinal direction and with first flow rate adjustment hole 135 and 136 communicating with the first communication hole 133 and being respectively open at upper and lower sides of the fixed body. The first flow rate adjustment holes 135 and 136 are symmetrically formed at the upper and lower sides of the fixed body 131.

The rotating body 141 is rotatably installed in the first communication hole 133 of the fixed body 131.

The rotating body 141 is provided with a second communication hole 143 extending in a longitudinal direction and a pair of second flow rate adjustment holes 145 and 146 that selectively communicate with the first adjustment holes 135 and 136 and with the second communication hole 143 according to a rotation operation of the rotating body 141. The second flow rate adjustment holes 145 and 146 are symmetrically formed at upper and lower sides of the rotating body 141, respectively.

As illustrated in FIG. 17, the first flow rate adjustment holes 135 and 136 formed in the fixed body 131 are long holes (a) linearly extending in the longitudinal direction of the fixed body 131 or long holes (b) obliquely extending with respect to the longitudinal direction of the fixed body 131. The first flow rate adjustment holes 135 and 136 may be a plurality of circular holes (c), rectangular holes (d), or oval holes (e) arranged at predetermined intervals in the longitudinal direction or the oblique direction of the fixed body 131. Alternatively, the first flow rate adjustment holes 135 and 136 may be a mixture of these holes.

The second adjustment holes 145 and 146 formed in the rotating body 141 are long holes (a) linearly extending in the longitudinal direction of the rotating body 141 or long holes (b) obliquely extending with respect to the longitudinal direction of the rotating body 141. The second adjustment holes 145 and 146 may be a plurality of circular holes (c), rectangular holes (d), or oval holes (e) arranged at predetermined intervals in the longitudinal direction of the rotating body 141 or the oblique direction. Alternatively, the second flow rate adjustment holes 145 and 146 may be a mixture of these holes.

The first flow rate adjustment holes 135 and 136 and the second flow rate adjustment holes 145 and 146 are aligned in any one alignment or a combined alignment shown in FIG. 16.

When the first flow rate adjustment holes 135 and 136 are long holes shown in (a) of FIG. 17 and the second flow rate adjustment holes 145 and 146 are obliquely arranged oval holes shown in (e) of 17, a communication area between the first flow rate adjustment holes 135 and 136 and the second flow rate adjustment holes 145 and 146 can be finely adjusted, so that a liquid discharge amount can be more precisely adjusted.

In addition, as illustrated in FIG. 16, the second communication hole 143 and the second flow rate adjustment holes 145 and 146 in the rotating body 141 are continuous holes extending in the longitudinal direction of the rotating body 141 while passing through the rotating body 141 from the upper end to the lower end, or a plurality of discrete holes that is separately arranged in the longitudinal direction of the rotating body while passing through the rotating body from the upper side to the lower side of the rotating body.

Herein, the term "discrete" means that the second flow rate adjustment holes 145 and 146 are separate holes formed through machining. The holes in (c), (d), and (e) of FIG. 17 are the discrete holes. In the case where the second flow rate adjustment holes 145 and 146 are discretely formed in the rotating body 141, the flow rate adjustment valve 130 has higher strength.

By operating the valve adjusting member 172 as illustrated in FIG. 15, it is possible to adjust the opening of the valve that is determined according to the alignment between the second flow rate adjustment holes 145 and 146 and the first flow rate adjustment holes 135 and 136.

The valve adjusting member 147 is connected to an end of the rotating body 141 to rotate the rotating body 141. That is, the rotating body 141 is rotated by rotating the valve adjusting member 147. The rotation of the rotating body 141 can bring about a state in which the second flow rate adjustment holes 145 and 146 of the rotating body 141 communicate with the first flow rate adjustment holes 135 and 136 of the fixed body 131. In this state, the liquid can flow into the second space 41 from the first space 31.

That is, a liquid discharge amount from the second space to the first space is adjusted in accordance with a communication area between the first flow rate adjustment holes 135 and 136 of the fixed body 131 and the second flow rate adjustment holes 145 and 146 of the rotating body 141.

Examples of the valve adjusting member 147 include a manual type, oil hydraulic type, electric type, pneumatic type, hydraulic type, gear, and combinations of these. The valve adjusting member 147 may be provided, to the flow race adjustment valve 130 exposed outside the column 10.

There may be only one liquid discharging unit 129 installed on the lower step portion 13 or 23 of a step structure. Alternatively, there may be more than one liquid discharging unit 129 to offer a coarse adjustment mode in which a large amount of liquid can be discharged and a fine adjustment mode in which a small amount of liquid can be discharged. The flow rate adjustment valve 130 serves as the liquid discharging unit and is directly attached to the lower step portion of a step structure (see A-2 in FIG. 8).

Figure 18:
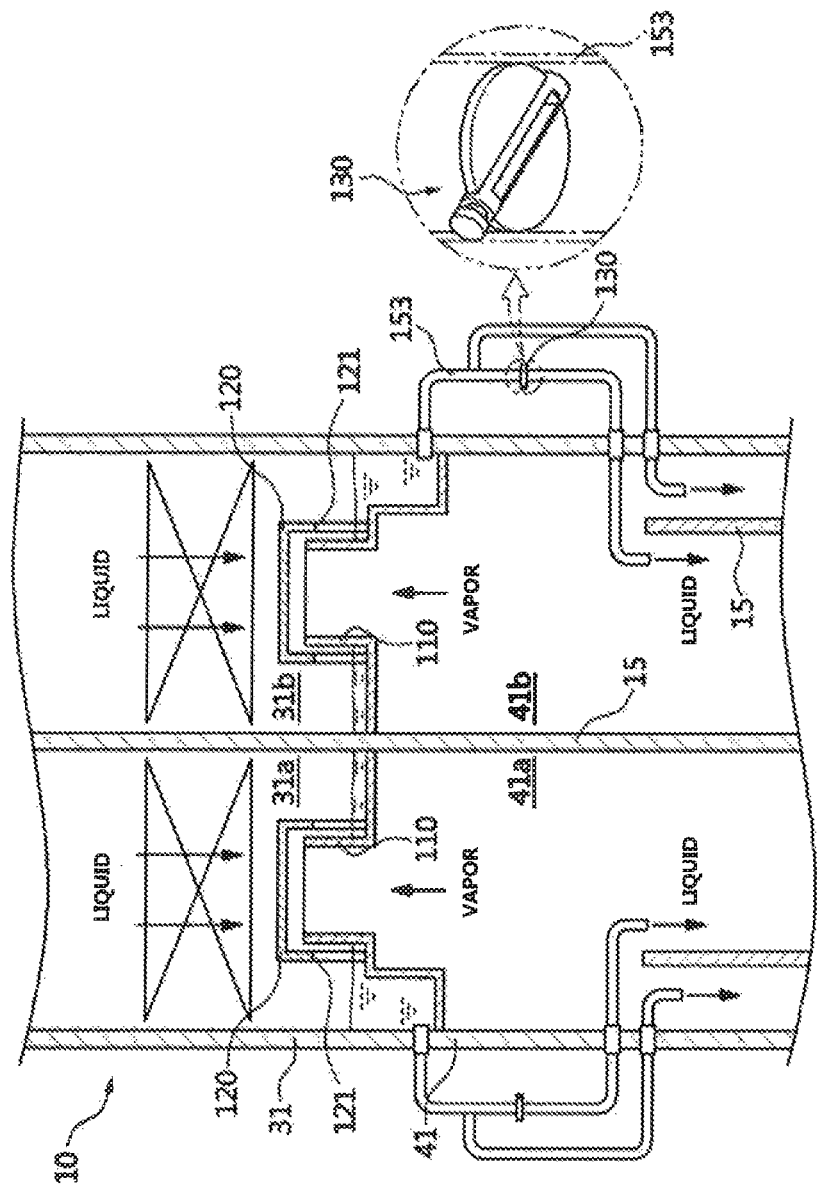
FIGS. 18 and 19 are diagrams illustrating other embodiments of the present invention in which one or more flow rate adjustment valves are Installed on a discharge pipeline.
Figure 19:
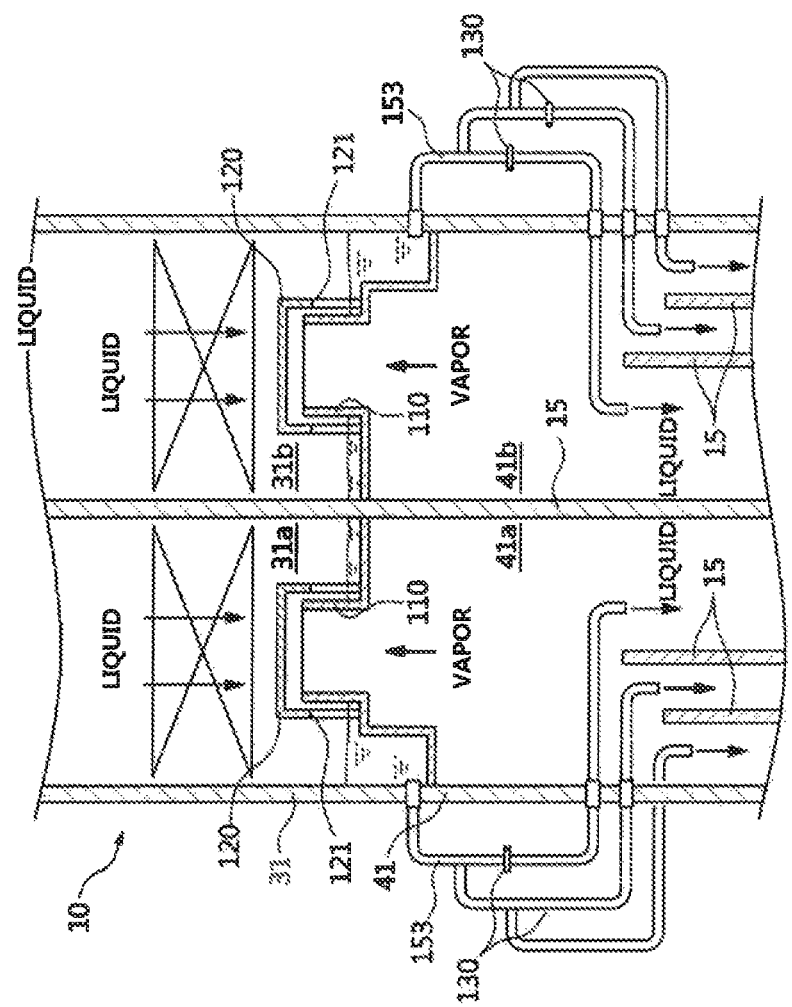

On the other hand, as illustrated in FIGS. 18 and 19, the vapor splitter further includes a discharge pipeline 153 connected to the chimney tray 11 or 21 to send the liquid in the first space 31 to the second space 41 therethrough. In this case, one or more flow rate adjustment valves 130 are installed on the discharge pipeline 153.

When two or more flow rate adjustment valves 130 and 130a are installed on the discharge pipeline 153, an adjustment operation can be switched between a coarse adjustment mode and a fine adjustment mode.

When the flow rate adjustment valves 130, 130a are installed on the discharge pipeline 153, they are arranged in the vertical direction. Alternatively, the flow rate adjustment valves 130, 130a can be arranged on the discharge pipeline 153 in the horizontal direction as necessary.

Aside from the flow rate adjustment valve, a general valve can be used to adjust the height of the liquid surface of the liquid on the chimney tray.

Hereinafter, an exemplary operation of the vapor splitter of the present invention is described.

As illustrated in FIG. 9, when liquid is fed from above the first space 31, the liquid is collected in the first section 31a and the second section 31b within the first space 31, i.e. on the chimney trays 11 and 21, and is then discharged out of the first and second sections 31a and 31b through the liquid discharging units 123 installed on the chimney trays 11 and 21.

For example, the liquid, fed to the first section 31a and the second section 31b of the first space 31, is temporarily stored in the first section 31a and the second section 31b of the first space 31, and is then discharged out of the first space 31 through the liquid discharging units 129. At this point, the height of the liquid surface in the first section 31a and the height of the liquid surface in the second section 31b are adjusted in accordance with the amount of liquid discharged through the liquid discharging units 129.

At this point, the liquid falling from the upper side of the first space 31 cannot enter into the chimney 110 due to the cap 120 covering the chimney 110.

The height of the liquid surface in each of the first section 31a and the second section 31b of the first space 31 is used to control the open area of the gas discharge hole 121 through which gas is discharged out of an assembled structure of the chimney 110 and the cap 120 covering the chimney 110. That is, the height of the liquid surface is used to control the gas discharge area.

That is, as illustrated in FIG. 10A, by controlling the gas discharge area "d" of the gas discharge hole 121 of the cap 120 by adjusting the height "c" of the liquid surface, it is possible to adjust vapor split ratios with respect to the first section 31a and the second section 31b (FIG. 9) of the first space 31 (FIG. 9).

For example, a ratio of liquid flows into the first section 31a and the second section 31b may be set to 1:1, and a ratio of gas flows may be set to 1:1. In this case, when the column is under normal operation, the preset ratios are maintained. However, when the composition of liquid supplied to a distillation column changes or when the concentration of target products to be obtained needs to be changed, the liquid split ratio or the vapor spirt ratio needs to be adjusted.

When the ratio of liquid flows into the first section 31a and the second section 31b is changed to 1.2:0.8, the pressure drops in the gas-liquid contact spaces in the first section 31a and the second section 31b change to be different from the design values. In this case, the pressure drop in the first section 31a is larger than the pressure drop in the second section 31b.

Due to the change in the pressure drop, the flow resistance of gas rising from the second space 41 is changed. For this reason, a larger amount of gas is fed to the second section 31b.

Thus, a smaller amount of gas is fed to the first section 31a that contains a larger amount of liquid, which negatively affects operation performance of the distillation column. Therefore, it is necessary to correspondingly adjust the ratio of gas flows into sections according to the ratio of liquid flows into the sections.

In this case, to feed a relatively larger amount of gas to the first section 31a, the open area of the gas discharge hole 121 that is present above the liquid surface in the second section 31b is reduced by a value corresponding to a difference in the pressure drop between the second section 31b and the first section 31a. That is, the difference in the pressure drop between the gas-liquid contact spaces is compensated, and thus the gas can be uniformly split with respect to the first section 31a and the second section 31b.

Since an amount of liquid fed to the first section 31a is increased, i.e., a ratio of liquid fluids into the first section 31a and the second section 31b is changed to 1.2:0.8, if the open area of the gas discharge hole 121, which is present above the liquid surface in the second section 31b, is further reduced, the gas split ratio can be closely adjusted to the desired ratio. In this way, it is possible to adjust a ratio of liquid flows and the ratio of gas flows into the gas-liquid contact spaces as desired.

Alternatively, the adjustment of the height of the liquid surface using the vapor splitter can be accomplished by lowering the liquid surface in the first section 31a, thereby preventing an excessive increase in the pressure drop.

For example, the height of the liquid surface can be controlled by adjusting the perforated plate 124 serving as the liquid discharging unit as illustrated in FIG. 11A. In this case, the number of the perforated plates is 1 or greater. Each perforated plate may have an equal aperture area or different aperture areas. The space under the perforated plates is divided into sections and the bottom or side of each divided section is provided with a valve. The height of the liquid surface can be controlled by selectively opening the valves.

As illustrated in FIG. 11B, the perforated plates can be installed outside the column 10. In this case, the height of the liquid surface in the first section can be externally controlled using the external perforated plates.

Alternatively, as illustrated in FIG. 11C, a plurality of nozzles 129 is installed at different heights to serve as the liquid discharging units. The flow rate adjustment valves connected to the nozzles 129 are Individually or collectively opened and closed. Alternatively, the nozzles 129 may be installed at the same height, and the discharge amount of liquid can be adjusted by the number of nozzles that are opened. In this way, the height of the liquid surface can be adjusted.

Alternatively, as indicated by A-2 of FIG. 9, the height of the liquid surface can be adjusted by adjusting the opening of the flow rate adjustment valve 130 provided as the liquid discharging unit.

Alternatively, as indicated by A-1 of FIG. 9, the height of the liquid surface can be adjusted by adjusting the opening of the flow rate adjustment valve 130 connected to the nozzle 129 serving as the liquid discharging unit.

Alternatively, as indicated by A-3 of FIG. 9, the height of the liquid surface can be adjusted by adjusting the flow rate of the flow rate adjustment pump 160 connected to the nozzle 123 serving as the liquid discharging unit.

Alternatively, as indicated by A-4 of FIG. 9, the height of the liquid surface can be adjusted by adjusting the opening of the pump and the flow rate adjustment valve 130 connected to the nozzle 129 serving as the liquid discharging unit.

Alternatively, the height of the liquid surface can be adjusted by adjusting the height of the weir 16 installed on the downcomer 127 serving as the liquid discharging unit in the first space.

The vapor splitter and the method of adjusting the vapor split ratio that have been described above control the vapor split ratio by adjusting the height of the liquid surface. Therefore, the vapor splitter and the method can save energy and improve operation performance when they are applied to a dividing wall column that aims to save energy.

In addition, as to the flow rate adjustment valve 130, the discharge flow rate of liquid can be adjusted by aligning the first flow rate adjustment holes 135 and 136 and the second flow rate adjustment holes 145 and 146 in any manner shown in FIG. 17.

In addition, one or more flow rate adjustment valves 130 may be directly installed on the chimney trays 11 and 21. In this case, coarse adjustment and fine adjustment can be selectively performed.

In addition, one or more flow rate adjustment valves 130 may be installed on the discharge pipelines 153 connected to the chimney trays 11 and 21 so that the liquid of first space 31 can be discharged to the second space 41. In this case, coarse adjustment and fine adjustment can be selectively performed when adjusting the discharge of liquid.

With the use of the vapor splitter described above, instead of attaching a mechanical device to a gas discharging unit and externally operating the mechanical device to adjust the vapor split ratio, the following adjustment method can be used: the height of the liquid surface is controlled to adjust the open area of the gas discharge hole 121 formed in an assembled structure of the chimney 110 and the cap 120 covering the chimney 110 or to adjust the open area between the lower end of the side wall of the cap 120A and the liquid surface.

Besides the function of adjusting the vapor split ratio, the vapor splitter of the present invention also has a function of controlling pressure drop when it is applied to a general distillation tower, a general absorption tower, or a reactor other than a dividing wall column. In this case, the vapor splitter functions to uniformly distribute gas in an upper space of the apparatus. That is, when an amount of gas introduced into the upper space from the lower space of the apparatus changes from a designed amount, the vapor splitter controls the pressure drop so that gas rising to the upper space through the chimney tray can be uniformly distributed in the upper space.

The protection scope of the present invention is not limited by the embodiments described above but should be defined by the accompanying claims. Furthermore, those skilled in the art will appreciate that various modifications, additions and substitutions are possible, without departing from the scope and spirit of the invention as disclosed in the accompanying claims.

DESCRIPTION OF THE REFERENCE NUMERALS IN THE DRAWINGS

10: housing (column)
11, 21: chimney tray
13, 23: lower portion of step structure
14: general chimney tray
15: vertical dividing wall
16: weir
17: gas-liquid contact space
20: upper space
30: lower space
31: first space
31a: first section
31b: second section
41: second space
41a: first section
41b: second section
110: chimney
120: cap
121: gas discharge hole
123: recess
124: liquid discharging unit (perforated plate)
125: entrainment preventing apparatus
126: downcomer sealing structure
127: liquid discharging unit (downcomer)
128: collector tray
129: liquid discharging unit (nozzle)
130: liquid discharging unit (flow rate adjustment valve)
132: liquid feed hole
131: fixed body
133: first communication hole
135, 136: first flow rate adjustment hole
141: rotating body
143: second communication hole
145, 146: second flow rate adjustment hole
147: valve adjusting member
153: discharge pipeline
154: gas flow guiding plate
155: deflection plate
156: louver
160: flow rate adjustment pump
170, 190: liquid feeding unit
180: liquid discharging unit

The invention claimed is:

1. A vapor splitter comprising:
a chimney tray dividing an internal space of a housing into an upper space and a lower space;
a chimney provided on an upper surface of the chimney tray such that the upper space and the lower space communicate with each other through the chimney;
a cap including a top plate and a side wall extending from the top plate, the cap being fixed outside the chimney with a distance from the chimney, the cap covering the chimney such that a gas discharge hole is disposed in the side wall such that gas, coming out through a hole formed in an upper end of the chimney, is transferred to the upper space through the gas discharge hole;
a liquid feeding unit for feeding liquid to the upper space of the housing; and
a liquid discharging unit comprising a flow rate adjustment valve for discharging the liquid out of the upper space of the housing,
wherein a size of the gas discharge hole is adjusted by adjusting a height of the liquid collected on the chimney tray by using the flow rate adjustment valve.

2. The vapor splitter according to claim 1, wherein the gas discharge hole has a form selected from the group consisting of:
(a) only one or more holes formed in the cap;
(b) one or more holes formed by one or more recesses provided at a lower end of the side wall of the cap when the lower end of the side wall of the cap is assembled with the upper surface of the chimney tray;
(c) a space defined by the cap and the chimney in a state in which the side wall is not in contact with the upper surface of the chimney tray;
(d) a space defined by the cap, the chimney, and the upper surface of the chimney tray in a state in which a portion of the side wall is in contact with the upper surface of the chimney tray; and
(e) a combination of the gas discharge hole of the item (b), (c), or (d) and one or more gas discharge holes formed in the top plate or the side wall of the cap.

3. The vapor splitter according to claim 2, wherein the gas discharge hole has a shape selected from the group consisting of a circular shape, an oval shape, a polygonal shape, a doughnut shape, and a slit shape.

4. The vapor splitter according to claim 1, wherein the cap is configured such that a shortest portion of the side wall when measured from the top plate extends to a position lower than the lowest portion of the upper end of the chimney.

5. The vapor splitter according to claim 1, wherein the gas discharge hole is formed in the side wall of the cap and a highest end of the gas discharge hole is lower than the lowest portion of the upper end of the chimney.

6. The vapor splitter according to claim 1, wherein the cap is fixed to the housing or the chimney by a fixing member, or in a manner that a portion of the lower end or the entire lower end of the side wall is in contact with the upper surface of the chimney tray.

7. The vapor splitter according to claim 1, wherein an upper surface of the top plate of the cap is provided with a flow channel for guiding a liquid flow, and the flow channel and the gas discharge hole are formed in different directions.

8. The vapor splitter according to claim 1, wherein the liquid feeding unit is any one kind selected from the group consisting of a nozzle, a valve, a perforated plate, a downcomer, a tray, a packing, a sprayer, a gas-liquid contact apparatus, and a gas condenser, or any combination of two or more kinds selected from the group.

9. The vapor splitter according to claim 1, wherein the liquid discharging unit further comprises any one kind selected from the group consisting of a nozzle, a perforated plate, and a downcomer, or any combination of two or more kinds selected from the group.

10. The vapor splitter according to claim 1, wherein the vapor splitter discharges the liquid fed into the upper space out of the upper space, and transfers gas from the lower space to the upper space.

11. The vapor splitter according to claim 1, wherein the vapor splitter is applied to a dividing wall column in which functions of two or more columns are combined, or to an apparatus for adjusting vapor split ratios with respect to two or more spaces.

\* \* \* \* \*